United States Patent
Shirota et al.

(10) Patent No.: US 10,760,449 B2
(45) Date of Patent: Sep. 1, 2020

(54) FIXING DEVICE, ROTARY MACHINE, MANUFACTURING METHOD OF ROTARY MACHINE, ASSEMBLING METHOD OF ROTARY MACHINE, AND DISASSEMBLING METHOD OF ROTARY MACHINE

(71) Applicant: MITSUBISHI HITACHI POWER SYSTEMS, LTD., Kanagawa (JP)

(72) Inventors: Akihiko Shirota, Kanagawa (JP);
Takeki Nakayama, Kanagawa (JP);
Mitsuhiro Adachi, Kanagawa (JP);
Hiroshi Inagaki, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 557 days.

(21) Appl. No.: 15/544,716

(22) PCT Filed: Feb. 17, 2016

(86) PCT No.: PCT/JP2016/054594
§ 371 (c)(1),
(2) Date: Jul. 19, 2017

(87) PCT Pub. No.: WO2016/133128
PCT Pub. Date: Aug. 25, 2016

(65) Prior Publication Data
US 2017/0362961 A1 Dec. 21, 2017

(30) Foreign Application Priority Data
Feb. 20, 2015 (JP) ................................. 2015-032289

(51) Int. Cl.
*F01D 25/26* (2006.01)
*F01D 25/24* (2006.01)
(Continued)

(52) U.S. Cl.
CPC ............... *F01D 25/26* (2013.01); *F01D 7/02* (2013.01); *F01D 9/041* (2013.01); *F01D 11/005* (2013.01);
(Continued)

(58) Field of Classification Search
CPC ........ F01D 25/24; F01D 25/243; F01D 25/28; F01D 25/285; F01D 25/26; F02C 7/20;
(Continued)

(56) References Cited

U.S. PATENT DOCUMENTS 2,247,378 A * 7/1941 Hinrichs ............... F01D 25/246
415/151
4,112,582 A 9/1978 Berkershoff
(Continued)

FOREIGN PATENT DOCUMENTS

DE 25 32 537 1/1977
JP 52-18512 2/1977
(Continued)

OTHER PUBLICATIONS

Written Opinion with International Search Report of the International Searching Authority dated May 24, 2016 in International Application No. PCT/JP2016/054594, with English-language translation.

(Continued)

*Primary Examiner* — Jonathan P Masinick
(74) *Attorney, Agent, or Firm* — Wenderoth, Lind & Ponack, L.L.P.

(57) ABSTRACT

A fixing device fixes a relative position in a rotational direction of an outer member and an inner member of a stationary body of the rotary machine, and includes: a radial pin that is inserted into a through hole passing through the outer member in a radial direction of a rotary machine and having a stepped portion formed therein to have a larger (Continued)

diameter at a portion on an outer side in the radial direction of the rotary machine than at a portion on an inner side in the radial direction, that has a part on the inner side in the radial direction of the rotary machine to be inserted into a concave portion of the inner member, and that has a flange portion on the outer side in the radial direction of the rotary machine.

14 Claims, 17 Drawing Sheets

(51) Int. Cl.
| | |
|---|---|
| F01D 25/28 | (2006.01) |
| F01D 25/00 | (2006.01) |
| F02C 7/00 | (2006.01) |
| F01D 7/02 | (2006.01) |
| F01D 9/04 | (2006.01) |
| F01D 11/00 | (2006.01) |
| F02C 7/20 | (2006.01) |
| F02C 7/28 | (2006.01) |

(52) U.S. Cl.
CPC ............ *F01D 25/00* (2013.01); *F01D 25/24* (2013.01); *F01D 25/243* (2013.01); *F01D 25/28* (2013.01); *F01D 25/285* (2013.01); *F02C 7/00* (2013.01); *F02C 7/20* (2013.01); *F02C 7/28* (2013.01); *F05D 2220/31* (2013.01); *F05D 2220/32* (2013.01); *F05D 2230/60* (2013.01); *F05D 2230/64* (2013.01); *F05D 2240/55* (2013.01); *F05D 2260/30* (2013.01)

(58) Field of Classification Search
CPC .... F02C 7/28; F05D 2220/30; F05D 2220/31; F05D 2220/32; F05D 2230/64; F05D 2240/55; F05D 2260/30
See application file for complete search history.

(56) References Cited

U.S. PATENT DOCUMENTS

| | | | | |
|---|---|---|---|---|
| 4,653,969 A * | 3/1987 | Summerlin | ............ | F16B 19/05 411/361 |
| 4,817,417 A * | 4/1989 | Twerdochlib | ........... | F16B 19/02 73/660 |
| 6,382,905 B1 * | 5/2002 | Czachor | ................ | F01D 11/122 415/9 |
| 7,581,922 B1 * | 9/2009 | Morimoto | ............... | F01D 25/26 415/126 |
| 8,231,338 B2 * | 7/2012 | Ballard, Jr. | ............. | F01D 25/26 415/126 |
| 8,794,587 B2 * | 8/2014 | Cant | ..................... | F01D 5/3053 248/672 |
| 8,870,533 B2 * | 10/2014 | Casavant | ............. | F01D 25/285 415/213.1 |
| 8,894,362 B2 * | 11/2014 | Fretwell | ................ | F01D 25/246 29/407.01 |
| 9,028,210 B2 | 5/2015 | Sankolli et al. | | |
| 9,739,177 B2 * | 8/2017 | Schaefer | ................ | F01D 25/246 |
| 10,563,541 B2 * | 2/2020 | Shirota | .................... | F16J 15/04 |
| 2013/0259646 A1 * | 10/2013 | Feindel | ................. | F01D 25/246 415/118 |
| 2013/0294907 A1 * | 11/2013 | Hoffacker | ............. | F01D 25/243 415/214.1 |
| 2014/0241876 A1 | 8/2014 | Schaefer et al. | | |
| 2016/0305287 A1 * | 10/2016 | Honda | .................. | F01D 25/246 |
| 2016/0341069 A1 * | 11/2016 | Inagaki | ................. | F04D 17/122 |
| 2019/0218934 A1 * | 7/2019 | Naik | ......................... | F02C 7/06 |

FOREIGN PATENT DOCUMENTS

| | | |
|---|---|---|
| JP | 56-18006 | 2/1981 |
| JP | 61-017104 U | 1/1986 |
| JP | 61-57104 | 4/1986 |
| JP | 61-140842 | 6/1986 |
| JP | 1-80603 | 5/1989 |
| JP | 01-175790 | 7/1989 |
| JP | 2005-171783 | 6/2005 |
| JP | 2013-257040 | 12/2013 |
| JP | 2014-066174 | 4/2014 |

OTHER PUBLICATIONS

Notification of Reasons for Refusal dated Nov. 28, 2018 in Japanese Application No. 2015-032289, with English translation.
Office Action dated Apr. 20, 2020 in German Application No. 112016000833.3 with English translation thereof.
Office Action dated Jun. 4, 2020 in corresponding Indian Patent Application No. 201747026153, with English Translation.

* cited by examiner

FIXING DEVICE, ROTARY MACHINE, MANUFACTURING METHOD OF ROTARY MACHINE, ASSEMBLING METHOD OF ROTARY MACHINE, AND DISASSEMBLING METHOD OF ROTARY MACHINE

FIELD

The present invention relates to a fixing device that fixes a relative position in a rotational direction of two members on a stationary side of a rotary machine, a rotary machine having the fixing device, a manufacturing method of the rotary machine, an assembling method of the rotary machine, and a disassembling method of the rotary machine.

BACKGROUND

Examples of a rotary machine include a steam turbine, a gas turbine, and a compressor. For example, a steam turbine has an outer casing, an inner casing provided inside the outer casing, a rotor inserted into the inner casing, a plurality of blades placed on the rotor in multiple stages, and a plurality of vanes placed on the inner casing in multiple stages. The blades and the vanes in the multiple stages are placed alternately in an axial direction of the rotor. The steam turbine causes steam to enter the inner casing to be supplied to a space in which the vanes and the blades in the multiple stages are placed, whereby the rotor is rotated via the blades in the multiple stages to drive an electric generator coupled to the rotor.

A rotary machine has various devices to fix a relative position of members (stationary bodies) on a stationary side (a fixed side) including the outer casing, the inner casing, and the vanes in a rotational direction, an axial direction, a horizontal direction, and the like of the rotary machine. For example, Patent Literature 1 describes a device that fixes a relative position of a vane ring that supports the vanes and an inner casing that supports the vane ring as a device that fixes a relative position of members on the stationary side in a rotational direction of a rotary machine. The device described in Patent Literature 1 has a radial pin that is inserted into a hole formed in the inner casing and has a distal end inserted into a concave portion formed in the vane ring. The radial pin is fixed to the inner casing by welding to be fixed to the inner casing and to seal between the inner casing and the radial pin.

CITATION LIST

Patent Literature

Patent Literature 1: Japanese Utility Model Laid-open Publication No. S61-17104

SUMMARY

Technical Problem

The fixing device described in Patent Literature 1 fixes the radial pin to the inner casing by welding to enable fixing to the inner casing and sealing of a portion to which the fixing device is inserted. However, because the fixing is performed by welding, the welding is required at the time of attachment and welded components need to be detached at the time of detachment. These operations require time.

The present invention has been achieved to solve the problems mentioned above and an object of the present invention is to provide a fixing device that enables easy attachment and detachment while keeping the sealing property, a rotary machine, a manufacturing method of the rotary machine, an assembling method of the rotary machine, and a disassembling method of the rotary machine (a releasing method of the rotary machine).

Solution to Problem

According to an aspect of the present invention to achieve the above object, a fixing device fixes a relative position in a rotational direction of an outer member and an inner member of a stationary body of a rotary machine, the fixing device comprising: a radial pin that is inserted into a through hole passing through the outer member in a radial direction of the rotary machine and having a stepped portion formed therein to have a larger diameter at a portion on an outer side in the radial direction of the rotary machine than at a portion on an inner side in the radial direction, that includes a part on the inner side in the radial direction of the rotary machine to be inserted into a concave portion of the inner member, and that includes a flange portion on the outer side in the radial direction of the rotary machine, an outside diameter of the flange portion being larger than a diameter of the through hole at the portion on the inner side in the radial direction of the rotary machine; a seal unit that is inserted into the through hole, that is located farther on the outer side in the radial direction of the rotary machine than the radial pin, and that is in contact with an inner circumferential surface of the through hole along the radial direction of the rotary machine to seal the through hole; and a cap member that is placed on the outer side of the seal unit in the radial direction of the rotary machine, and that is fixed to the outer member.

Advantageously, in the fixing device, the seal unit includes a sleeve that has a diameter of an inner circumferential surface changing along the radial direction of the rotary machine, and a columnar insertion member that is inserted into the sleeve and is in contact with the inner circumferential surface of the sleeve. An outer circumferential surface of the sleeve is in contact with the through hole, and the inner circumferential surface of the sleeve and the insertion member are in contact with each other to seal the through hole.

Advantageously, in the fixing device, the sleeve includes the inner circumferential surface passing through the sleeve along the radial direction of the rotary machine, and the radial pin includes an engagement portion to and from which a jig is attachable and detachable from the outer side in the radial direction being formed on an end face thereof on the outer side in the radial direction.

Advantageously, in the fixing device, the sleeve is placed farther on the inner side in the radial direction of the rotary machine than the insertion member.

Advantageously, the fixing device comprises a liner placed between the sleeve and the radial pin. The liner has an outside diameter larger than an outside diameter of the radial pin, and extends in a radial direction of the radial pin farther to an inner side than the outside diameter of the radial pin.

Advantageously, the fixing device comprises a plurality of the seal units. The seal units are placed serially in the radial direction of the rotary machine.

Advantageously, in the fixing device, the cap member includes a thread groove formed in an outer circumferential surface, and is screwed into a thread groove formed in the through hole to be fixed to the outer member.

Advantageously, in the fixing device, the flange portion includes a seal ring placed on an end face thereof on the inner side in the radial direction of the rotary machine, and the seal ring is in contact with the through hole and the flange portion.

According to another aspect of the present invention to achieve the above object, a rotary machine comprises: the fixing device according to any one of the above; the outer member; the inner member; and a rotary body placed farther on the inner side in the radial direction of the rotary machine than the inner member.

Advantageously, in the rotary machine, the outer member includes a convex portion that protrudes inward in the radial direction of the rotary machine at a part having the through hole formed therein; a surface along a direction perpendicular to an axis of the rotary machine is formed in a rotational direction on the convex portion; the inner member includes a groove portion at a part facing the convex portion, the groove portion being concave inward in the radial direction of the rotary machine and being in contact with the surface of the convex portion along the direction perpendicular to the axis of the rotary machine; and a surface of the groove portion in contact with the surface of the convex portion along the direction perpendicular to the axis of the rotary machine is a surface along the direction perpendicular to the axis of the rotary machine.

According to still another aspect of the present invention to achieve the above object, a manufacturing method of a rotary machine for fixing a relative position in a rotational direction of an outer member and an inner member of a stationary body of a rotary machine and manufacturing the rotary machine comprises the steps of: inserting, into a through hole passing through the outer member in a radial direction of the rotary machine and having a stepped portion formed therein to have a larger diameter at a portion on an outer side in the radial direction of the rotary machine than at a portion on an inner side in the radial direction, a radial pin that includes a flange portion with an outside diameter larger than a diameter of the through hole at the portion on the inner side in the radial direction of the rotary machine, and inserting an end of the radial pin on the inner side in the radial direction of the rotary machine into a concave portion of the inner member placed on the inner side of the outer member in the radial direction of the rotary machine; inserting a seal unit into the through hole having the radial pin inserted therein; and biasing the seal unit inserted into the through hole inward in the radial direction of the rotary machine, and bringing the seal unit into contact with an inner circumferential surface of the through hole along the radial direction of the rotary machine to seal the through hole.

Advantageously, the manufacturing method of a rotary machine comprises a step of increasing a diameter of a hole, formed in the outer member along the radial direction of the rotary machine, at a portion of the hole on the outer side in the radial direction of the rotary machine relative to a diameter of the hole to form the through hole.

According to still another aspect of the present invention to achieve the above object, an assembling method of a rotary machine for fixing a relative position in a rotational direction of an outer member and an inner member of a stationary body of a rotary machine and assembling the rotary machine comprises the steps of: inserting, into a through hole passing through the outer member in a radial direction of the rotary machine and having a stepped portion formed therein to have a larger diameter at a portion on an outer side in the radial direction of the rotary machine than at a portion on an inner side in the radial direction, a radial pin that includes a flange portion with an outside diameter larger than a diameter of the through hole at the portion on the inner side in the radial direction of the rotary machine, and inserting an end of the radial pin on the inner side in the radial direction of the rotary machine into a concave portion of the inner member placed on the inner side of the outer member in the radial direction of the rotary machine; inserting a seal unit into the through hole having the radial pin inserted therein; and biasing the seal unit inserted into the through hole inward in the radial direction of the rotary machine, and bringing the seal unit into contact with an inner circumferential surface of the through hole along the radial direction of the rotary machine to seal the through hole.

Advantageously, the assembling method of a rotary machine comprises a step of increasing a diameter of a hole, formed in the outer member along the radial direction of the rotary machine, at a portion of the hole on the outer side in the radial direction of the rotary machine relative to a diameter of the hole to form the through hole.

According to still another aspect of the present invention to achieve the above object, there is provided a disassembling method (a releasing method) of a rotary machine for disassembling a rotary machine having an inner member and an outer member of a stationary body fixed with a fixing device, the fixing device including, in a through hole formed in the outer member, a radial pin that includes a part on an inner side in a radial direction of the rotary machine inserted into a concave portion of the inner member, a seal unit that is located farther on an outer side in the radial direction of the rotary machine than the radial pin, and that is in contact with an inner circumferential surface of the through hole along the radial direction of the rotary machine to seal the through hole, and a cap member fixed to the outer member farther on the outer side in the radial direction of the rotary machine than the seal unit, the disassembling method comprising the steps of: disassembling the cap member inserted into the through hole; taking the seal unit out of the through hole; and taking the radial pin out of the through hole.

Advantageously, in the disassembling method of a rotary machine, the seal unit includes a sleeve being in contact with the through hole; the step of taking the seal unit out of the through hole includes the steps of attaching a jig to an engagement portion of a target member that is in direct or indirect contact with a surface of the sleeve on the inner side in the radial direction of the rotary machine and that includes the engagement portion to which the jig is attachable from the outer side in the radial direction of the rotary machine formed on a surface on the outer side in the radial direction of the rotary machine, and taking the sleeve out of the through hole along with the target member; and the jig is inserted into the sleeve and the jig is attached to the engagement portion at the step of taking the seal unit out of the through hole.

Advantageously, in the disassembling method of a rotary machine, the outer member includes a structure divided into an outer-member upper half and an outer-member lower half; and the disassembling method includes the steps of passing a tool through the through hole of the outer-member upper half or the outer-member lower half from which the radial pin has been taken out, and holding the inner member with the tool, and relatively moving the outer-member upper half or the outer-member lower half from which the radial pin has been taken out with respect to the inner member in a state where the inner member is held with the tool.

Advantageous Effects of Invention

According to the present invention, the seal unit is provided farther on an outer side in a radial direction than the radial pin, and the cap member is further provided on the outer side in the radial direction, whereby easy attachment and detachment can be achieved while the sealing property is kept.

DESCRIPTION OF EMBODIMENTS

A preferred embodiment of the present invention will be described below in detail with reference to the accompanying drawings. The present invention is not limited to the embodiment, and when there are a plurality of embodiments, embodiments formed by combining these embodiments are also included in the present invention. For example, the present embodiment is described while assuming a case where a rotary machine is a steam turbine; however, the present invention is not limited thereto. The rotary machine can be a gas turbine, a compressor, or the like. A fixing device can be used at various positions where components of a stationary part (a non-rotating part) of the rotary machine need to be fixed to each other. The fixing device can be applied to members that are placed in a positional relation of an outer side in the radial direction and an inner side in the radial direction among stationary bodies of the rotary machine, such as an outer casing, an inner casing, a vane ring, and a dummy ring in a steam turbine, and a vane ring and a casing of a compressor in a gas turbine.

Figure 1:
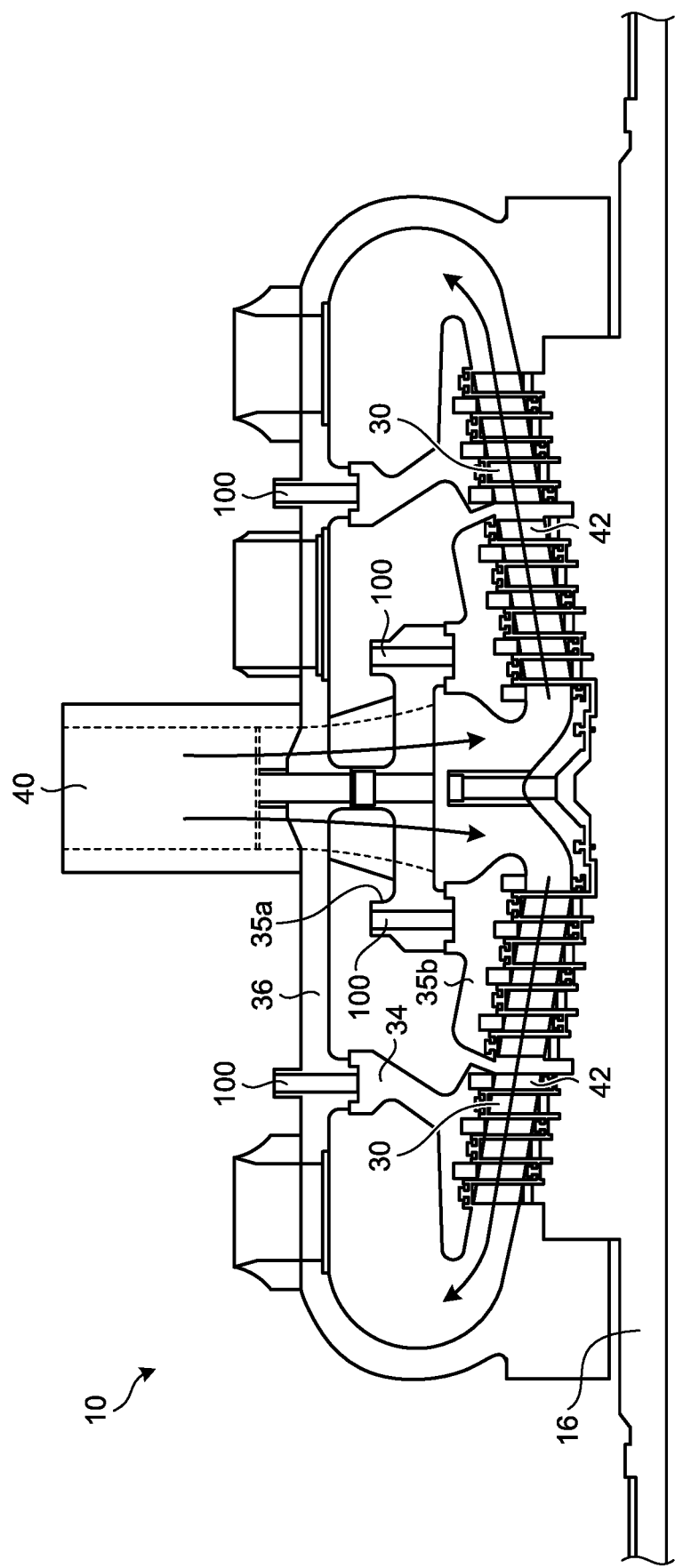
FIG. 1 is a partial sectional view illustrating a general configuration of a steam turbine having a fixing device according to an embodiment of the present invention.

FIG. 1 is a partial sectional view illustrating a general configuration of a steam turbine having a fixing device according to an embodiment of the present invention. A steam turbine 10 illustrated in FIG. 1 supplies steam from a center side in an axial direction of the steam turbine 10, so that the steam flows toward both ends in the axial direction and is emitted outside from both ends in the axial direction. The steam turbine 10 has a rotor 16, a plurality of blades 30 coupled to the rotor 16, an inner casing 34 placed on an outer periphery of the blades 30, an outer casing 36 placed on an outer side of the inner casing 34, a steam inlet 40 that supplies steam to the inner casing 34, and a plurality of vanes 42 placed in an inner part of the inner casing 34. In the steam turbine 10, the plurality of blades 30 coupled to the rotor 16 and the plurality of vanes 42 placed in the inner part of the inner casing 34 are placed alternately. The inner casing 34 is sometimes divided into an outer member 35a fixed to the outer casing 36 and an inner member 35b coupled to the vanes 42. The outer member 35a can be referred to as "inner casing" and the inner member 35b can be referred to as "vane ring". In the steam turbine 10, fixing devices 100 are provided at a coupling portion between the inner casing 34 and the outer casing 36, and a coupling portion between the inner member 35b and the outer member 35a, respectively.

In the steam turbine 10, steam supplied from the steam inlet 40 passes a region in which the blades 30 and the vanes 42 are placed alternately between the inner casing 34 and the rotor 16. The rotor 16 of the steam turbine 10 rotates with rotation of the blades 30 due to power of the passing steam.

Figure 2:
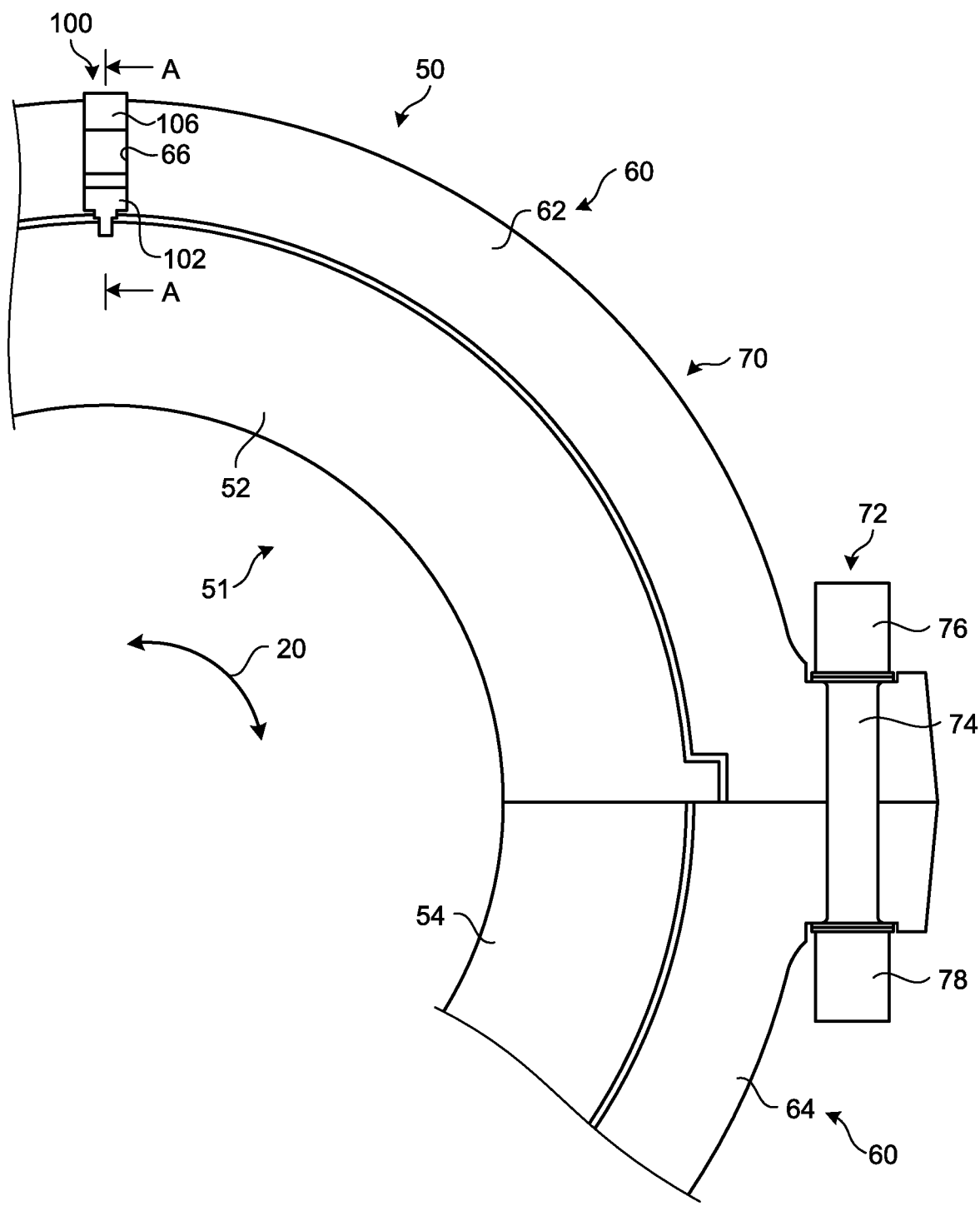
FIG. 2 is a sectional view conceptually illustrating a fixing unit of the steam turbine illustrated in FIG. 1.

A fixing unit 70 including the fixing device 100 is described next with reference to FIG. 2. FIG. 2 is a sectional view conceptually illustrating the fixing unit of the steam turbine illustrated in FIG. 1. Two members of a stationary portion fixed by the fixing device 100 are collectively referred to as "annular member" 50. The annular member 50 has an inner member 51 and an outer member 60. The inner member 51 and the outer member 60 are annular members and the inner member 51 is placed on an inner side of the outer member 60. In the case of the fixing device 100 that fixes the inner casing 34 and the outer casing 36, the inner member 51 corresponds to the inner casing 34 and the outer member 60 corresponds to the outer casing 36. In the case of the fixing device 100 that fixes the inner member 35b and the outer member 35a of the inner casing 34, the inner member 51 corresponds to the inner member 35b and the outer member 60 corresponds to the outer member 35a.

The inner member 51 has an inner-member upper half 52 and an inner-member lower half 54. In the inner member 51, end faces of the inner-member upper half 52 in a rotational direction 20 and end faces of the inner-member lower half 54 in the rotational direction 20 are in contact with each other. That is, in the inner member 51, division faces of the inner-member upper half 52 and the inner-member lower half 54 are in contact with each other. In this example, a side surface is a surface seen when the steam turbine 10 is viewed in the vertical direction. The outer member 60 has an outer-member upper half 62 and an outer-member lower half 64. In the outer member 60, a flange formed on a side surface of the outer-member upper half 62 and a flange formed on a side surface of the outer-member lower half 64 are in contact with each other.

The fixing unit 70 including the fixing device 100 fixes the inner member 51 and the outer member 60 to each other. That is, the fixing unit 70 fixes the inner member 51 and the outer member 60 to prevent relative positions of the respective parts from being changed. The fixing unit 70 has an outer-member fixing device 72 and the fixing device 100. The fixing unit 70 can further include a device that fixes the upper half and the lower half of the inner member or a device that adjusts the relative position.

The outer-member fixing device 72 fixes the outer-member upper half 62 and the outer-member lower half 64 to each other. The outer-member fixing device 72 includes a screw 74 inserted into the flanges where the outer-member upper half 62 and the outer-member lower half 64 are in contact with each other, and nuts 76 and 78 screwed on the screw 74. The outer-member fixing device 72 fastens the outer-member upper half 62 and the outer-member lower half 64 by sandwiching and tightening the screw 74 inserted into the flanges with the nuts 76 and 78.

The fixing device 100 fixes a relative position of the inner member 51 and the outer member 60 in a rotational direction of the rotor 16. That is, the fixing device 100 restrains the outer member 60 from rotating with respect to the inner member 51 and restrains the inner member 51 from rotating with respect to the outer member 60. The fixing device 100 is inserted into a through hole 66 formed in the outer-member upper half 62 and into a concave portion 56 formed at a position on the inner-member upper half 52 seen when the through hole 66 is viewed from outside. The concave portion 56 is formed at a part in the rotational direction. The fixing device 100 is inserted into the through hole 66 and the concave portion 56, so that when force with which the inner member 51 and the outer member 60 relatively rotate in the rotational direction of the rotor 16 is applied, a surface of the fixing device 100 at an end in the rotational direction is brought into contact with the through hole 66 and the concave portion 56. Accordingly, the fixing device 100 restrains the inner member 51 and the outer member 60 from relatively rotating in the rotational direction of the rotor 16.

Figure 3:
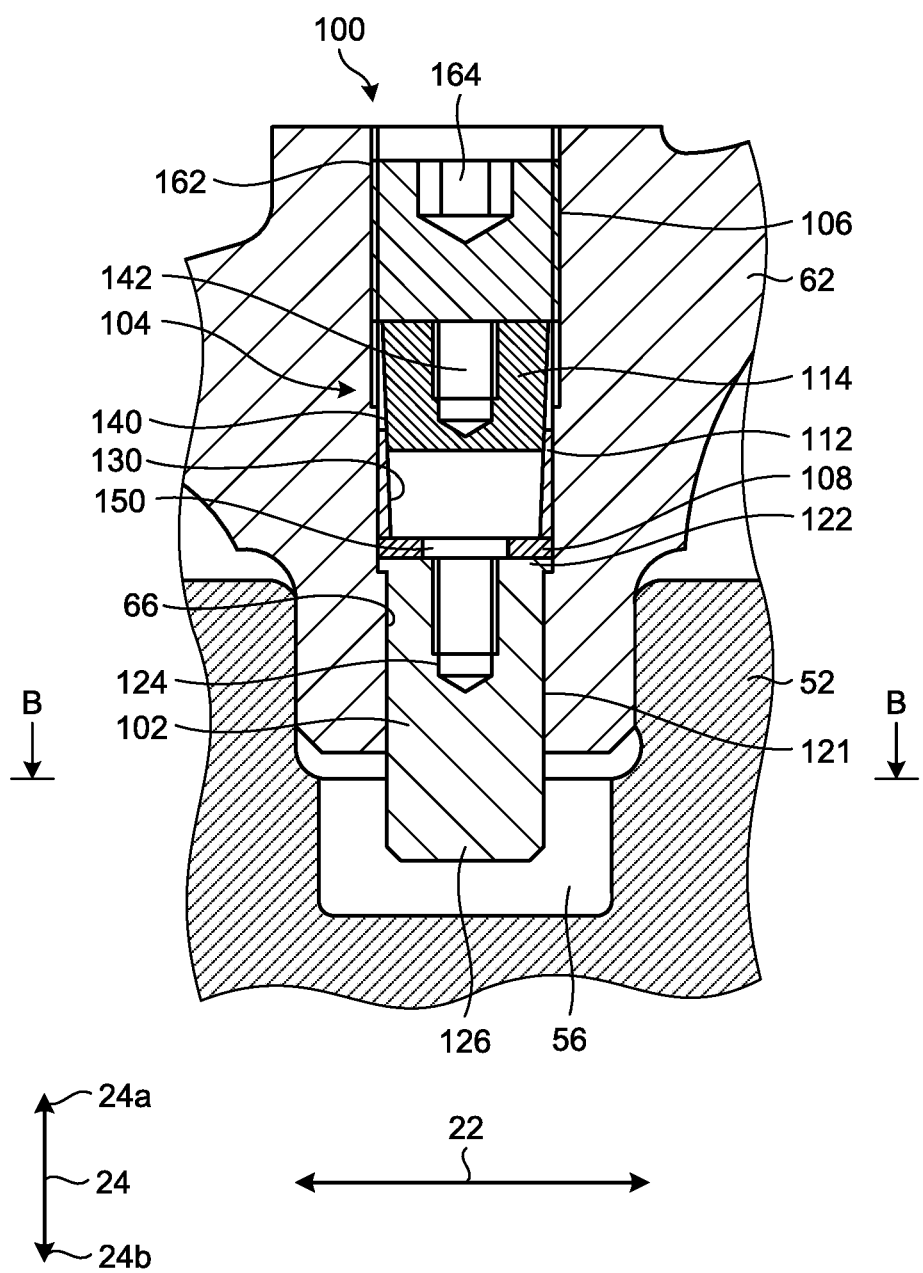
FIG. 3 is a sectional view illustrating a general configuration of the fixing device.
Figure 4:
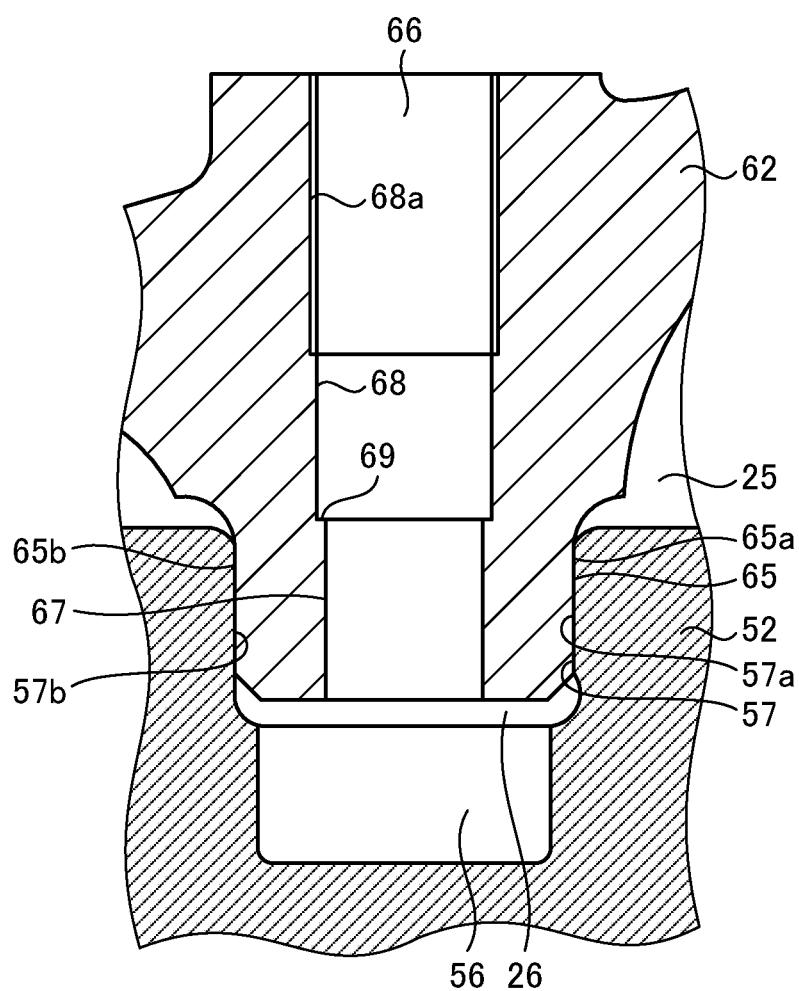
FIG. 4 is a sectional view illustrating a general configuration of an outer member and an inner member in a state where the fixing device is removed therefrom.
Figure 5:
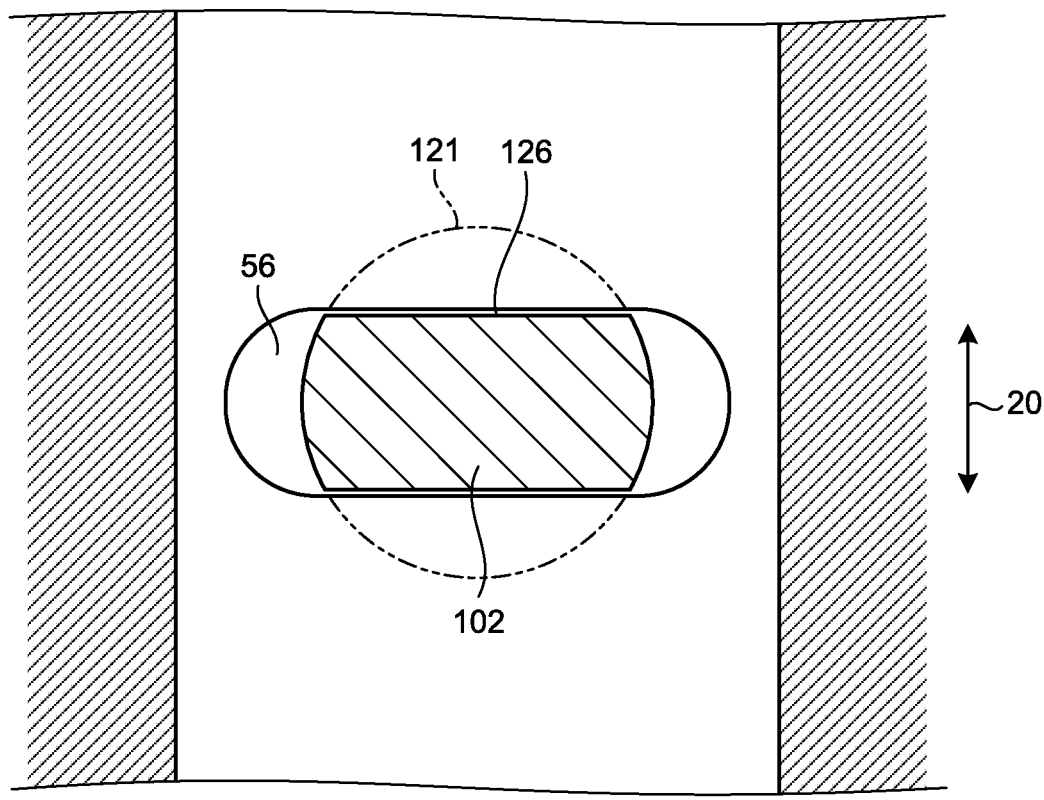
FIG. 5 is a schematic diagram illustrating a relative position of the inner member and a radial pin.
Figure 6:
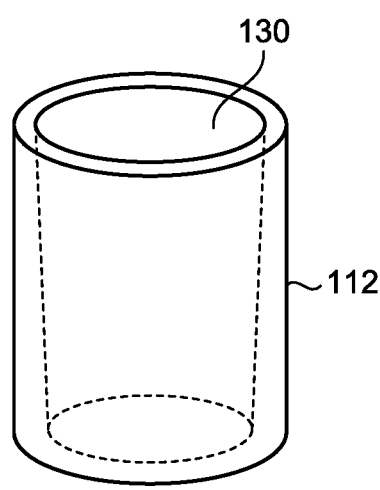
FIG. 6 is a perspective view illustrating a general configuration of a sleeve.

FIG. 3 is a sectional view illustrating a general configuration of the fixing device. FIG. 4 is a sectional view illustrating a general configuration of the outer member and the inner member in a state where the fixing device is removed therefrom. FIG. 5 is a sectional view along a line B-B in FIG. 3 and is a schematic diagram illustrating a relative position of the inner member and a radial pin. FIG. 6 is a perspective view illustrating a general configuration of a sleeve. FIG. 3 is a sectional view along a line A-A in FIG. 2.

As illustrated in FIG. 3, the fixing device 100 has a radial pin 102, a seal unit 104, a cap member 106, and a liner 108 and is inserted into the through hole 66 and the concave portion 56. The through hole 66 and the concave portion 56 into which the fixing device 100 is inserted are described with reference to FIGS. 3 and 4. A radial direction of the rotor 16 being a rotary portion of the steam turbine 10 is hereinafter referred to as "rotor radial direction". The rotor radial direction is a steam-turbine radial direction and is a rotary-machine radial direction indicating a radial direction of a rotation axis of the rotary machine. In the through hole 66, the diameter of a first surface 67 being a portion on an inner side in the rotor radial direction (on an inner side 24b in a radial direction 24 of the rotor 16) is smaller than the diameter of a second surface 68 being a portion on an outer side in the rotor radial direction (on an outer side 24a in the radial direction 24 of the rotor 16). The through hole 66 has a stepped portion 69 at a boundary between the first surface 67 and the second surface 68. The stepped portion 69 is a surface seen when the through hole 66 is viewed from outside in the rotor radial direction, that is, a surface facing outward in the rotor radial direction. The diameter at the portion on the outer side of the stepped portion 69 in the rotor radial direction is larger than that at the portion on the inner side thereof in the rotor radial direction. In this way, the through hole 66 has an outer through hole being a portion formed by the second surface 68, and an inner through hole being a portion formed by the first surface 67, connected to the outer through hole at the inner side thereof in the rotor radial direction, and having a smaller diameter than the outer through hole. The through hole 66 has a thread groove 68a formed in the second surface 68. The concave portion 56 is formed in a groove portion 57 of the inner-member upper half 52. The groove portion 57 is a groove formed on the entire circumference in the rotational direction. That is, the groove portion 57 is formed in both the inner-member upper half 52 and the inner-member lower half 54, and the respective groove portions are connected to be the groove formed on the entire circumference. A convex portion 65 provided at a portion of the outer member 60 where the through hole 66 is formed is inserted into the groove portion 57. The convex portion 65 is a protrusion that protrudes inward in the rotor radial direction, is formed at a position facing the groove portion 57, and is formed on the entire circumference in the rotational direction similarly to the groove portion 57. In the groove portion 57 and the convex portion 65, a surface 57a and a surface 65a being contact surfaces on the side of a high-pressure steam space 25, that is, on the side of a space where steam at a higher pressure flows in an axial direction 22 are in contact with each other to be a sealing surface. In the fixing device 100, a space on a side nearer the steam inlet 40 than the sealing surface where the surface 57a and the surface 65a are in contact with each other is the high-pressure steam space 25, and a space on a side nearer an end portion in the axial direction 22 than the sealing surface where the surface 57a and the surface 65a are in contact with each other is a low-pressure steam space 26 where the pressure is lower than that in the high-pressure steam space 25. Because it suffices that the surface 57a and the surface 65a are in contact with each other in the groove portion 57 and the convex portion 65, a part or the entirety of surfaces 57b and 65b in the circumferential direction on the opposite side to the sealing surface in the axial direction 22 can be omitted.

The components of the fixing device 100 are described next. The radial pin 102 is inserted into the through hole 66 and an end thereof on the inner side in the rotor radial direction protrudes from the through hole 66 to the inner side in the rotor radial direction. A part of the radial pin 102 protruding from the through hole 66 is inserted into the concave portion 56. The radial pin 102 is a columnar pin and has a shape with a diameter of an outer circumferential surface 121 being substantially the same as or slightly smaller than that of the first surface 67 of the through hole 66. The radial pin 102 is provided with a flange 122 having a diameter larger than that of the outer circumferential surface 121 at an end located on the outer side in the rotor radial direction in a state where the radial pin 102 is inserted into the through hole 66. The diameter of the flange 122 is larger than that of the first surface 67 and smaller than that of the second surface 68. The flange 122 is in contact with the stepped portion 69. The radial pin 102 has a screw hole 124 formed in a surface on a side where the flange 122 is formed. A tool is inserted into the screw hole 124 when the radial pin 102 is to be inserted or detached. The radial pin 102 also has a cutout surface 126 at a part of an end of the outer circumferential surface 121 on the inner side in the rotor radial direction. As illustrated in FIG. 5, the radial pin 102 has such a shape that the diameter of the outer circumferential surface 121 is larger than a width of the concave portion 56 in the rotational direction 20. Provision of the cutout surface 126 enables the end on the inner side in the rotor radial direction of the radial pin 102 to be inserted into the concave portion 56. Furthermore, due to formation of the cutout surface 126, the width of the radial pin 102 in the rotational direction can be set substantially the same as that of the concave portion 56. While the cutout surface 126 is provided on both ends in the rotational direction in the present embodiment, the cutout surface 126 can be provided on one of the ends. The cutout surfaces 126 provided on both ends in the rotational direction can have an asymmetrical shape with respect to an axis of the outer circumferential surface. While the cutout surfaces 126 are provided on the radial pin 102 in the present embodiment, a configuration in which the width of the radial pin 102 is adjusted according to the width of the concave portion 56 to fit the radial pin 102 therein can be adopted as another example.

Next, the seal unit 104 is inserted into the through hole 66 to be placed on the outer side of the radial pin 102 in the rotor radial direction. The seal unit 104 supports the radial pin 102 from the outer side in the rotor radial direction and restrains the radial pin 102 from moving outward in the rotor radial direction. The seal unit 104 also seals, that is, blocks the through hole 66. Specifically, the seal unit 104 is in contact with an inner circumferential surface of the through hole 66 along the rotor radial direction to seal the through hole 66.

The seal unit 104 has a sleeve 112 and an insertion member 114. As illustrated in FIG. 6, the sleeve 112 is a member in a tubular shape, a cylindrical shape in the present embodiment, along the through hole 66. The sleeve 112 has a shape with a diameter of an outer circumferential surface smaller than that of the second surface 68 of the through hole 66. The sleeve 112 has a tapered shape with a diameter of an inner circumferential surface 130 decreasing toward the inner side in the rotor radial direction.

The insertion member 114 is a columnar member. The insertion member 114 is placed farther on the outer side in the rotor radial direction than the sleeve 112. The insertion member 114 has a tapered shape with a diameter of an outer circumferential surface 140 decreasing toward the inner side in the rotor radial direction. An inclination angle of the outer circumferential surface 140 with respect to the rotor radial direction is substantially the same as that of the inner circumferential surface 130 of the sleeve 112 with respect to the rotor radial direction. "Being substantially the same" means that there is no difference in the angle other than an error occurring at the time of manufacturing. The inclination angle of the outer circumferential surface 140 with respect to the rotor radial direction can be an angle different from that of the inner circumferential surface 130 of the sleeve 112 with respect to the radial direction. The insertion member 114 has a screw hole 142 formed in a surface on the outer side in the rotor radial direction.

The seal unit 104 has the configuration as described above and, by inserting the insertion member 114 into the sleeve 112 from the outer side in the rotor radial direction to bring the inner circumferential surface 130 into contact with the outer circumferential surface 140, and pushing out the sleeve 112 to the outer side in the rotor radial direction while keeping the inner circumferential surface 130 in contact with the outer circumferential surface 140, the sleeve 112 is brought into contact with the through hole 66. The seal unit 104 fills a gap between the sleeve 112 and the insertion member 114 and a gap between the sleeve 112 and the through hole 66 to seal the through hole 66.

The cap member 106 is a columnar member and is inserted into the through hole 66. The cap member 106 is placed farther on the outer side in the rotor radial direction than the seal unit 104. The cap member 106 according to the present embodiment has an end face on the outer side in the rotor radial direction being placed farther on the inner side in the rotor radial direction than an end face of the outer-member upper half 62 on the outer side in the rotor radial direction, and is embedded in the through hole 66. The cap member 106 is fixed to the outer-member upper half 62 having the through hole 66 formed therein. The cap member 106 has a thread groove formed in an outer circumferential surface 162 and is screwed on the thread groove 68a in the second surface 68 of the through hole 66. The cap member 106 has a thread groove 164 formed in the end face on the outer side in the rotor radial direction. A tool is inserted into the thread groove 164 when the cap member 106 is to be inserted or detached.

The liner 108 is placed between the sleeve 112 and the radial pin 102. The liner 108 is a ring-shaped member having a cylindrical hole 150 formed therein. The liner 108 is a member that adjusts a thickness of the seal unit 104 in the rotor radial direction. The liner 108 has a diameter on the inner side in the rotor radial direction, that is, a diameter of the cylindrical hole 150 smaller than that of the inner circumferential surface 130 of the sleeve 112. That is, the liner 108 has a width in the radial direction larger than that of the sleeve 112. Accordingly, the liner 108 can be in contact with the flange 122 of the radial pin 102 while supporting the sleeve 112, and restrains the sleeve 112 from being sandwiched between the radial pin 102 and the through hole 66 or the sleeve 112 from being unintendedly deformed. It suffices that the liner 108 has a shape having the outside diameter larger than that of the radial pin 102 and extending farther to an inner side than the outside diameter of the radial pin 102 in the radial direction of the radial pin 102, and thus the effect described above can be achieved.

The fixing device 100 fixes a relative position of the outer member 60 and the inner member 51 in the rotational direction of the rotor 16 with the radial pin 102, seals the through hole 66 with the seal unit 104 placed farther on the outer side in the rotor radial direction than the radial pin 102, and prevents the radial pin 102 and the seal unit 104 from moving outward in the rotor radial direction and slipping out of the through hole 66 with the cap member 106. Accordingly, the fixing device 100 can fix the relative position of the outer member 60 and the inner member 51 in the rotational direction of the rotor 16 while sealing the through hole 66. Furthermore, in the fixing device 100, the cap member 106 is screwed with the threaded structure to be fixed to the outer member 60, while sealing is achieved by blocking the respective members with the seal unit 104 while being inserted. Therefore, the fixing device 100 can be fixed without welding. This enables easy attachment to or detachment from the annular member 50. Furthermore, the fixing device 100 provides a sealing structure that deforms the sleeve 112 of the seal unit 104 placed inside the through hole 66 with the insertion member 114 and brings the sleeve 112 into contact with the inner circumferential surface along the rotor radial direction of the through hole 66, to enable sealing even at a narrow place where the diameter of the through hole 66 cannot be large. The outer member 60 and the inner member 51 are fixed with the radial pin 102 and sealed with the seal unit 104, and accordingly the outer member 60 and the inner member 51 can be fixed while keeping the sealing property even when the centers of the concave portion 56 and the through hole 66 are not aligned. Due to the structure of the seal unit 104 in which the insertion member 114 is pressed into the sleeve 112 to achieve sealing, relative positions of the respective members are moved in an aligning direction even when the centers of the members are misaligned at the time of insertion. Therefore, the sealing property can be enhanced.

The fixing device 100 has the seal unit 104 and the radial pin 102. Therefore, even when an axial center of the through hole 66 at a position where the seal unit 104 is inserted, that is, an axial center of the cylindrical through hole formed by the second surface 68 and an axial center of the through hole at a position where the radial pin 102 is inserted, that is, an axial center of the cylindrical through hole formed by the first surface 67 are misaligned, the seal unit 104 can freely move in the radial direction with respect to the radial pin 102, thereby enabling the sleeve 112 to be expanded uniformly. This allows accuracy of the axial center of the through hole to be low and thus the through hole can be manufactured easily.

The fixing device 100 further has the liner 108, whereby the sleeve 112 can be supported stably with the liner 108, and the sleeve 112 can be uniformly expanded even when the axial center of the through hole on the inner side in the rotor radial direction and the axial center of the through hole on the outer side in the rotor radial direction where the sleeve 112 is placed are misaligned. Furthermore, the support of the sleeve 112 with the liner 108 can prevent the sleeve 112 from entering the gap between the flange 122 of the radial pin 102 and the through hole and deforming therein. Therefore, because the accuracy of the axial center of the through hole is allowed to be low, the through hole can be manufactured easily.

The fixing device 100 has the liner 108 provided between the radial pin 102 and the seal unit 104 to support the sleeve 112 with the liner 108, thereby enabling to prevent the sleeve 112 from being sandwiched between the radial pin 102 and the through hole 66. Accordingly, the sleeve 112 can be thinned and the sleeve 112 can be formed in an easily deformable shape. By forming the sleeve 112 to be thinner and easily deformable in this way, the sealing property between the sleeve 112 and the through hole 66 and between the sleeve 112 and the insertion member 114 can be enhanced, and the sealing property of the seal unit 104 can be enhanced. Furthermore, due to provision of the liner 108, the fixing device 100 can adjust a position in the rotor radial direction, that is, in a depth direction of the through hole 66 more easily. That is, because the thickness of the liner 108 can be adjusted with a shim or the like, the position of the sleeve 112 in the depth direction of the through hole 66 can be set to a fixed position regardless of the shape of the radial pin 102.

Because the fixing device 100 can be embedded in the through hole 66, the fixing device 100 can be provided also in a structure in which there is another member on the side of the outer circumferential surface of the outer member 60 and an available space is limited.

While the holes formed in the respective surfaces on the outer side in the rotor radial direction of the radial pin 102, the insertion member 114, and the cap member 106 are screw holes in the embodiment described above, the holes are not limited to those with a thread groove formed therein. A hole on which a tool can be held to enable rotation thereof or a hole on which a tool can be caught suffices. While this would make attachment and detachment less easy, holes for providing contact with a tool can be omitted from the surfaces of the radial pin 102, the insertion member 114, and the cap member 106 on the outer side in the rotor radial direction to avoid the labor of working the holes.

Figure 7:
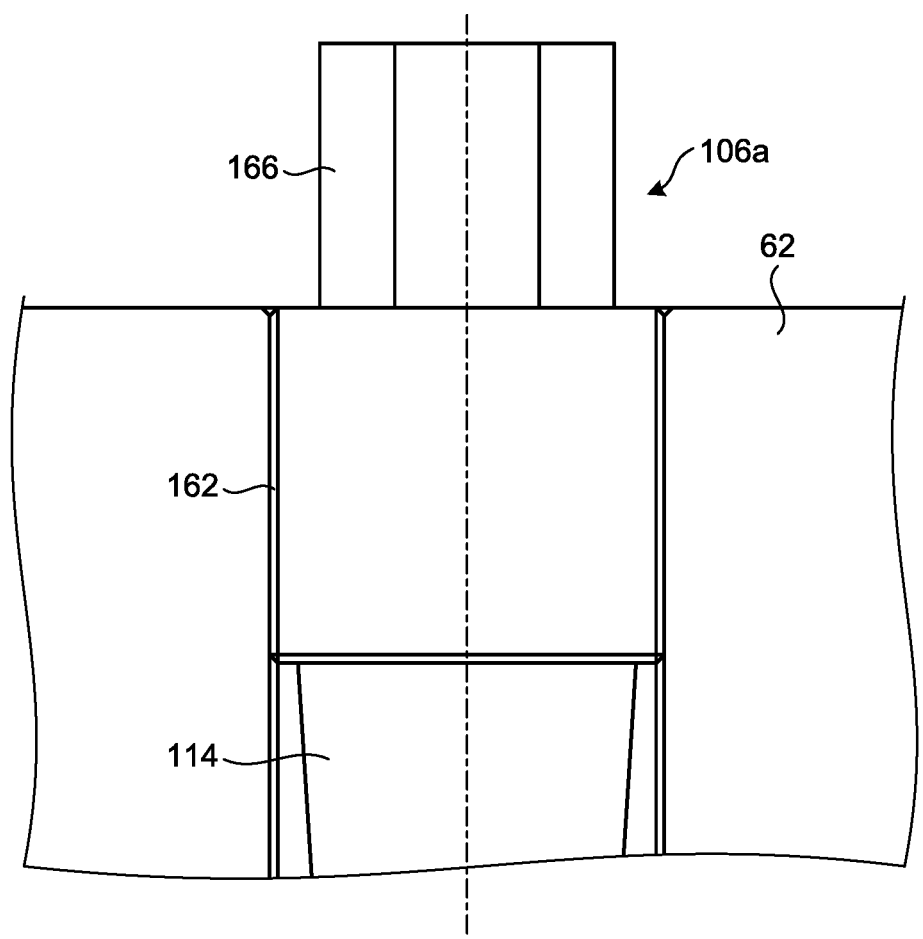
FIG. 7 is a sectional view illustrating another example of a cap member.

FIG. 7 is a sectional view illustrating another example of the cap member. While the thread groove 164 is formed in the cap member 106 of the fixing device 100 in the embodiment described above, the cap member is not limited thereto. A cap member 106a illustrated in FIG. 7 has a hexagonal protruding portion 166 on the outer side in the rotor radial direction of a portion where the outer circumferential surface 162 is provided. In the cap member 106a, the protruding portion 166 protrudes from the surface of the outer-member upper half 62 at the time of attachment to the outer-member upper half 62. The protruding portion 166 enables the cap member 106a to be rotated with a tool such as a hexagonal wrench. In this way, a position where a tool is attached when the cap member 106 is to be screwed to the thread groove 68a of the through hole 66, other than the screw hole, can be provided on the fixing device 100.

Figure 8:
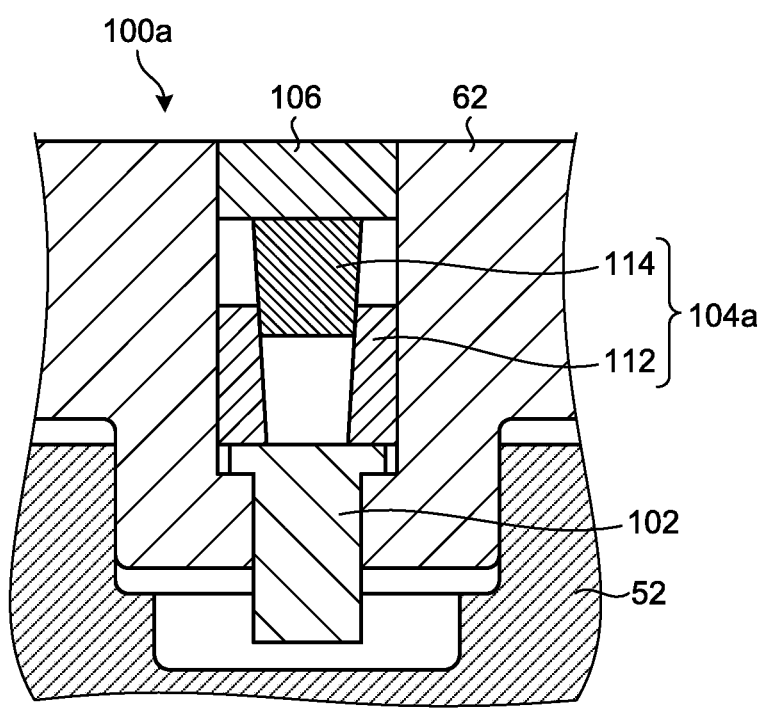
FIG. 8 is a schematic diagram illustrating a general configuration of another example of the fixing device.

FIG. 8 is a schematic diagram illustrating a general configuration of another example of the fixing device. FIG. 8 illustrates the fixing device in a more schematic way than in the structure illustrated in FIG. 3. A fixing device 100a illustrated in FIG. 8 has an identical structure except for not including the liner 108. In the fixing device 100a, illustrations of holes for enabling contact of a tool with the surfaces on the outer side in the rotor radial direction are omitted. As in the fixing device 100a, the sleeve 112 of a seal unit 104a can be in direct contact with the radial pin 102 without the liner 108.

Figure 9:
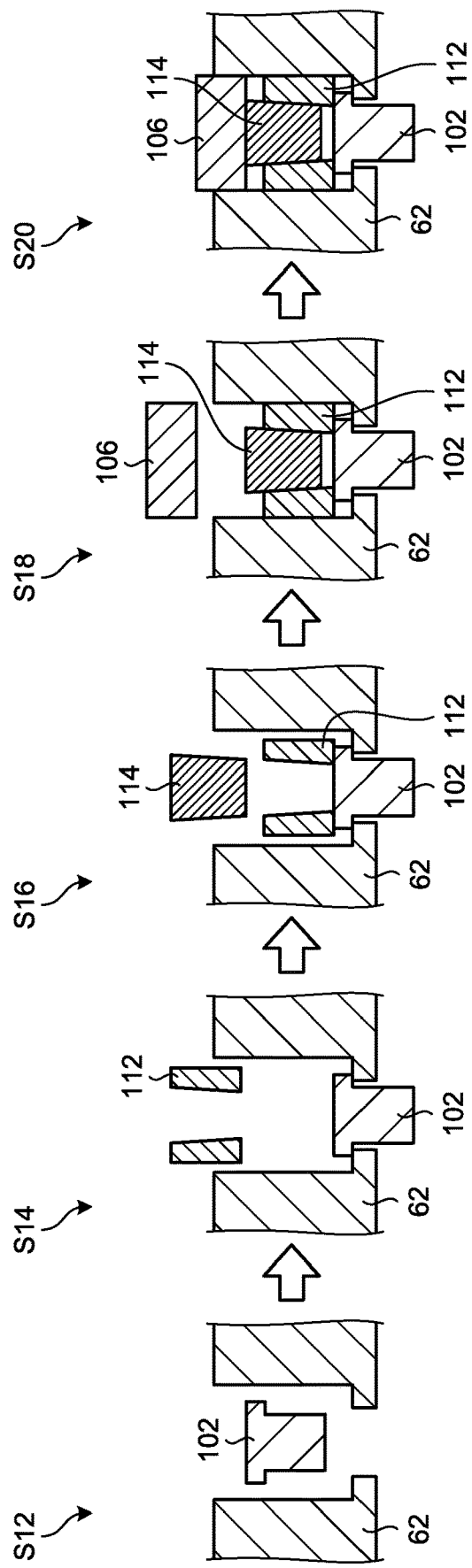
FIG. 9 is an explanatory diagram illustrating an example of a method of attaching the fixing device.

An attaching method of the fixing device being an assembling method of a rotary machine is described next with reference to FIG. 9. FIG. 9 is an explanatory diagram illustrating an example of a method of attaching the fixing device. The assembling method of a rotary machine can be used when a rotary machine is assembled after the rotary machine is disassembled for maintenance or the like or when a rotary machine is manufactured. While being described as the assembling method of a rotary machine in the present embodiment, the attaching method of the fixing device can be also applied to a manufacturing method of a rotary machine. Processes illustrated in FIG. 9 can be achieved by a worker performing operations using a tool or a machine. First, the worker inserts the radial pin 102 into the through hole 66 of the outer-member upper half 62 (Step S12). At that time, the worker checks a relative position of the through hole 66 and the concave portion 56 and forms the cutout surface 126 on the radial pin 102 based on a result of the check. This enables the distal end of the radial pin 102 to be inserted into the concave portion 56 and causes the distal end of the radial pin 102 to be fitted into the concave portion 56 in the rotational direction of the rotor 16 when the radial pin 102 is inserted into the through hole 66.

Next, the worker inserts the sleeve 112 into the through hole 66 having the radial pin 102 inserted therein (Step S14) and then inserts the insertion member 114 therein (Step S16). When a seal unit includes a liner, the liner is inserted into the through hole 66 before insertion of the sleeve 112.

Subsequently, the worker inserts the cap member 106 into the through hole 66 (Step S18). Specifically, the thread groove of the cap member 106 is screwed into the thread groove of the through hole 66. At that time, the worker can appropriately push the insertion member 114 into the sleeve 112 of the seal unit 104 by setting a pushing position and a fastening torque of the cap member 106 at predetermined values, and can produce a state in which the through hole 66 is sealed with the seal unit 104. The worker inserts the cap member 106 into the through hole 66 to fix the cap member 106 to the outer-member upper half 62 (Step S20).

By installing the fixing device 100 in the manner described above, the worker can easily attach the fixing device 100 to the annular member 50. Accordingly, the annular member 50 can be easily assembled in such a state that the annular member 50 will not rotate in the rotational direction without using welding.

Figure 10:
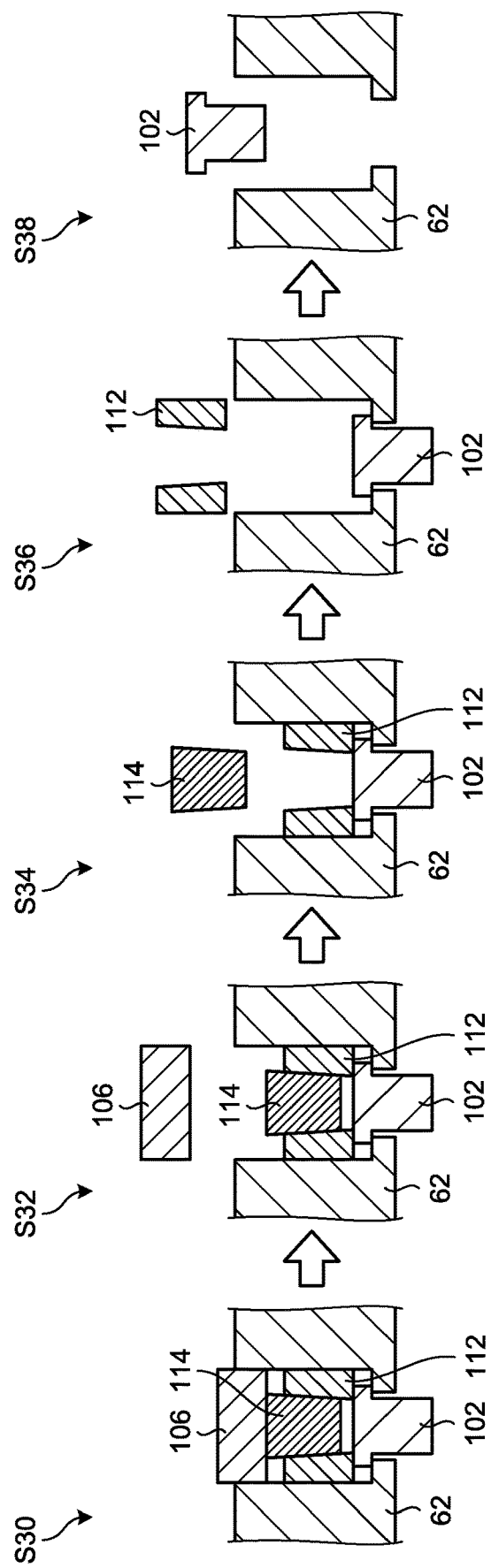
FIG. 10 is an explanatory diagram illustrating an example of a method of detaching the fixing device from an annular member.
Figure 11:
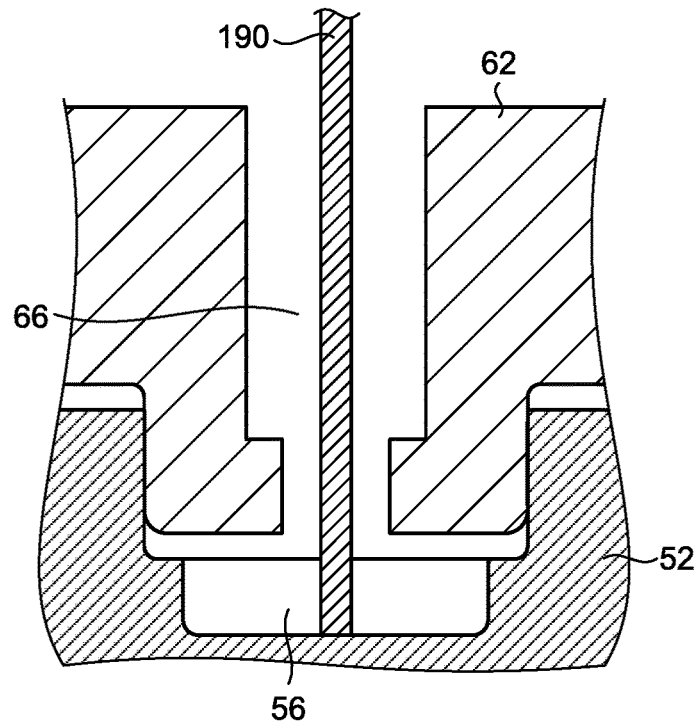
FIG. 11 is an explanatory diagram illustrating an example of a method of detaching the outer member from the inner member.

A detaching method of the fixing device being a disassembling method (a releasing method) of a rotary machine is described next with reference to FIGS. 10 and 11. FIG. 10 is an explanatory diagram illustrating an example of a method of detaching the fixing device from the annular member. FIG. 11 is an explanatory diagram illustrating an example of a method of detaching the outer member from the inner member. After detaching the fixing device according to the detaching method of FIGS. 10 and 11, and then performing inspection of an inner portion of the annular member or replacement of a component, a worker can assemble a rotary machine (the annular member) by attaching the fixing device 100 according to the attaching method of FIG. 9 described above.

First, a worker detaches the cap member 106 from the annular member 50 (Step S32) in a state where the fixing device 100 is attached (Step S30). Specifically, the worker rotates the cap member 106 to detach the cap member 106 from the thread groove of the through hole. Next, the worker detaches the insertion member 114 (Step S34), detaches the sleeve 112 (Step S36), and thereafter detaches the radial pin 102 (Step S38).

When having detached the fixing device 100 from the annular member 50 and further detached the outer-member fixing device 72 of the fixing unit 70, the worker detaches the outer-member upper half 62 from the outer-member lower half 64 and the inner member 51. In this case, the worker inserts a rod-like tool (jig) 190 into the through hole 66 as illustrated in FIG. 11, and moves the outer-member upper half 62 with respect to the outer-member lower half 64 and the inner member 51 while causing the tool (jig) 190 to abut on the concave portion 56. Due to this process, even when a state is reached where the outer-member upper half 62 and the inner-member upper half 52 adhere to each other, for example, even when the surface 65a and the surface 57a being the sealing surfaces are seized to each other due to deformation caused by heat, the inner member 51 can be restrained from moving with the outer-member upper half 62 and the outer-member upper half 62 can be detached appropriately.

Figure 12:
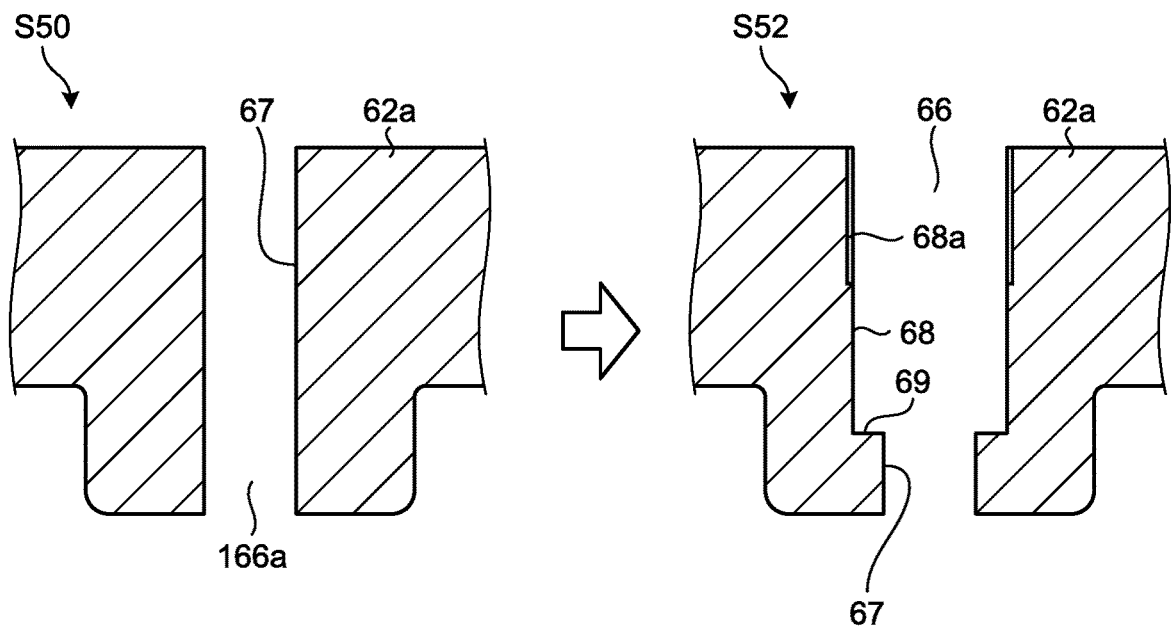
FIG. 12 is an explanatory diagram illustrating an example of a method of working a through hole.

Furthermore, according to the assembling method of a fixing device, when a fixing device that is currently attached is not the fixing device according to the present embodiment, a through hole can be worked to enable the fixing device 100 to be attached. FIG. 12 is an explanatory diagram illustrating an example of a method of working a through hole. On an outer-member upper half 62a having a through hole 166a with an unchanging diameter formed by the first surface 67 (Step S50), a worker performs working to increase the diameter of a part of the through hole 166a on the outer side in the rotor radial direction to form the second surface 68 and forms the thread groove 68a to form the through hole 66 (Step S52). After performing the working illustrated in FIG. 12, the worker can attach the fixing device 100 to the annular member 50 by performing the attachment of the fixing device 100 illustrated in FIG. 9.

When worked in this way, the through hole can be altered to a hole in which the fixing device 100 can be attached. Furthermore, the alteration of the through hole can be achieved in the outer-member upper half 62 mounted, during inspection of a device having an annular member installed therein. Therefore, the alteration can be performed without interrupting other operations. That is, the alteration can be performed without affecting the entire work period.

Figure 13:
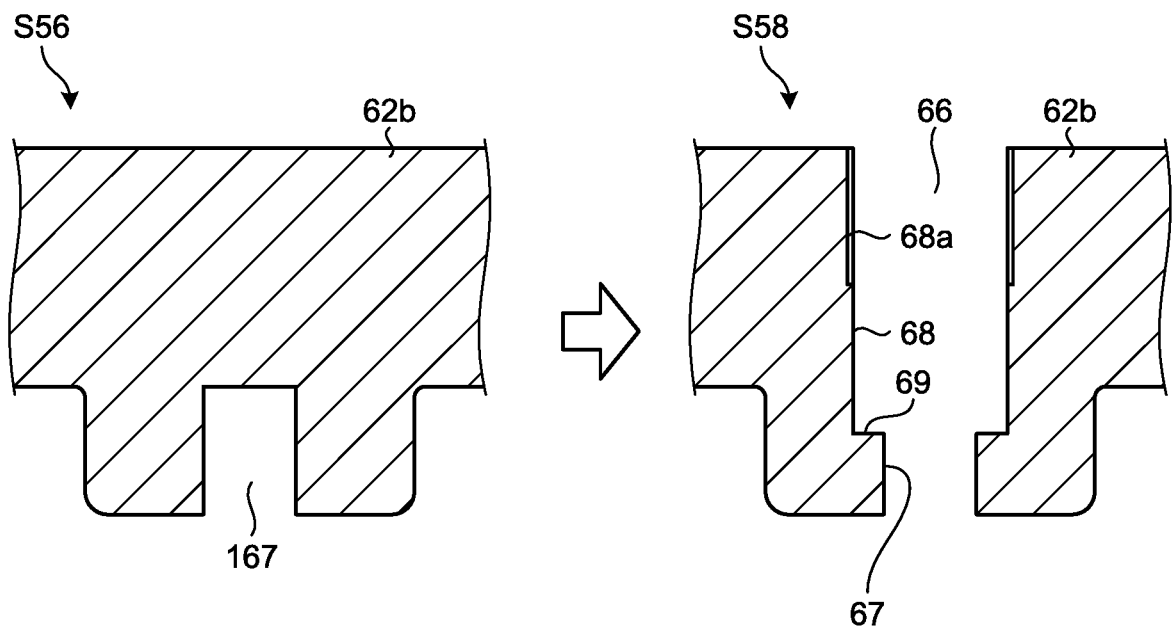
FIG. 13 is an explanatory diagram illustrating an example of a method of working a through hole.

While the case where the through hole 66 is formed from the state where the through hole 166a is already formed has been described in the example illustrated in FIG. 12, the through hole 66 according to the present embodiment can be formed also in a state where no through hole is formed in the outer-member upper half 62. FIG. 13 is an explanatory diagram illustrating an example of a method of working a through hole. An outer-member upper half 62b illustrated in FIG. 13 has a hole 167 formed in a surface on the inner side in the rotor radial direction that does not pass through the outer-member upper half 62b to the outer side in the rotor radial direction (Step S56). A worker performs working of forming a hole extending to the hole 167 on the outer-member upper half 62b, having the non-through hole 167 formed therein, from the outer side in the rotor radial direction to form the second surface 68 and forms the thread groove 68a to form the through hole 66 (Step S58). When the diameter of the hole 167 is smaller than that of the first surface 67 of the through hole 66, the worker performs working to increase the diameter. After performing the working illustrated in FIG. 13, the worker can attach the fixing device 100 to the annular member 50 by performing the attachment of the fixing device 100 illustrated in FIG. 9.

Also when the axis of the first surface 67 of the through hole 66 and the axis of the second surface 68 are misaligned, the fixing device 100 according to the present embodiment can support the seal unit 104 with the cap member 106 so as not to be slipped out, while keeping the sealing property of the seal unit 104. Accordingly, even when the working to connect a hole to the hole 167 is performed as illustrated in FIG. 13 and the axes of the holes are misaligned at that time, the function as the fixing device 100 can be kept. This eliminates the need to perform axis alignment of the holes with high accuracy and facilitates the working.

Figure 14:
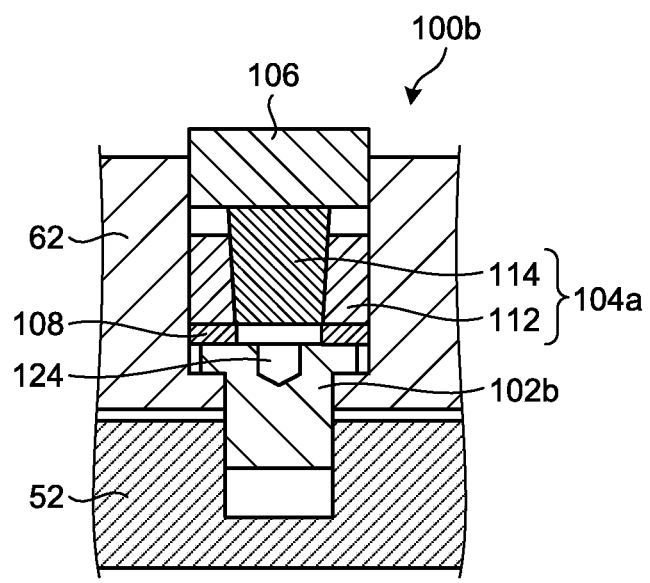
FIG. 14 is a schematic diagram illustrating a general configuration of another example of the fixing device.
Figure 15:
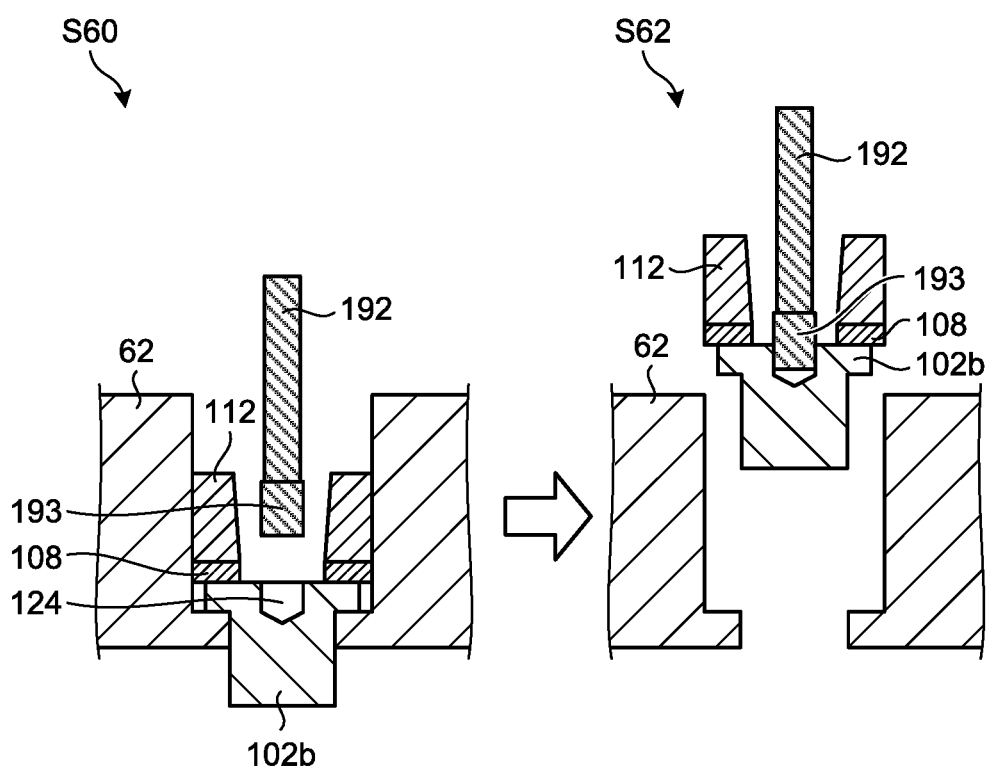
FIG. 15 is an explanatory diagram illustrating an example of a method of detaching the fixing device from the annular member.

FIG. 14 is a schematic diagram illustrating a general configuration of another example of the fixing device. FIG. 15 is an explanatory diagram illustrating an example of a method of detaching the fixing device from the annular member. In a fixing device 100b illustrated in FIG. 14, the screw hole 124 is formed in a radial pin 102b as in the fixing device 100. Due to formation of the screw hole 124 in the radial pin 102b, the radial pin 102b can be detached from the through hole 66 more easily. In the fixing device 100b, the liner 108 is placed between the radial pin 102b and the seal unit 104a.

Specifically, as illustrated in FIG. 15, a rod-like tool (jig) 192 having a thread groove 193 formed on a distal end is used, and the distal end of the rod-like tool 192 having the thread groove 193 formed thereon is screwed in the screw hole 124 of the radial pin 102b in a state where the insertion member 114 is detached (Step S60). At that time, the sleeve 112 and the liner 108 remain in the inner portion of the through hole 66 as illustrated in FIG. 15. That is, the rod-like tool 192 is inserted into the holes of the inner portions of the sleeve 112 and the liner 108 and the distal end of the rod-like tool 192 is screwed into the screw hole 124 of the radial pin 102b. By pulling the rod-like tool 192 out of the through hole 66 in a state where the thread groove 193 is screwed to the screw hole 124, the sleeve 112 and the liner 108 are taken out of the through hole 66 using the radial pin 102b (Step S62).

In this way, formation of the screw hole 124 in the radial pin 102b enables the sleeve 112 to be easily taken out of the through hole 66. Specifically, when the sleeve 112 has a structure of sealing high-pressure steam with the outer circumferential surface and the outer circumferential surface of the sleeve 112 sticks to the through hole 66 and reaches a state where the sleeve 112 is difficult to take out of the through hole 66, the sleeve 112 can be pulled out with the radial pin 102b by pulling the radial pin 102b out of the through hole 66 using the rod-like tool 192.

The formation of the screw hole 124 in the radial pin 102b also enables the radial pin 102b itself to be easily taken out of the through hole 66. While the case of the radial pin has been described in FIG. 15, the same holds for the case of the insertion member 114, and provision of a screw hole enables the insertion member 114 to be easily taken out of the through hole 66.

In the fixing device 100, when a screw hole is formed, the cylindrical hole 150 is provided in the liner 108 to enable a rod-like tool to be screwed into the screw hole even in a state where the liner 108 is installed on the outer side of a target component in the rotor radial direction. While it is preferable that the liner 108 has a through hole because the workability can be increased, the through hole is not necessarily provided. Alternatively, a screw hole can be formed in the liner 108. A structure to catch the rod-like tool 192 can be provided in the liner 108 and the sleeve 112 can be pulled out with the liner 108 by pulling out the liner 108 using the rod-like tool 192. A structure can be alternatively applied in which the sleeve 112 is formed in a non-through shape, and a screw hole is formed on a bottom (a portion on the inner side in the rotor radial direction) of the sleeve 112 to pull the sleeve 112 out of the through hole 66 with the rod-like tool 192.

Other examples of the fixing device are described below with reference to FIGS. 16 to 24. In configurations of the fixing devices of the other examples, descriptions of a configuration identical to that of the fixing device 100 are omitted and points specific to the other examples are mainly described.

Figure 16:
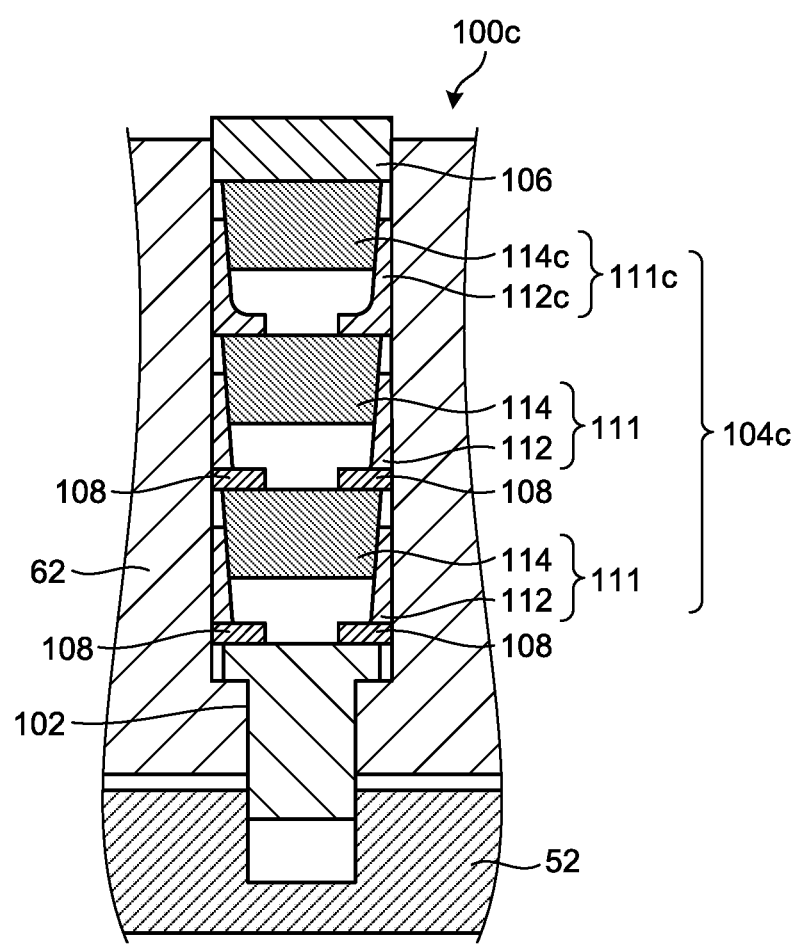
FIG. 16 is a schematic diagram illustrating a general configuration of another example of the fixing device.

FIG. 16 is a schematic diagram illustrating a general configuration of another example of the fixing device. A fixing device 100c illustrated in FIG. 16 has a seal unit 104c including two unitary units 111 and one unitary unit 111c. The unitary units 111 and the unitary unit 111c are placed serially in the rotor radial direction. One unitary unit 111 has the sleeve 112 and the insertion member 114. In the unitary unit 111 that is placed on the innermost side in the rotor radial direction, a surface of the sleeve 112 on the inner side in the rotor radial direction is in contact with the radial pin 102. The insertion member 114 thereof is in contact with a surface of the sleeve 112 on the inner side in the rotor radial direction of the unitary unit 111 placed on the outer side in the rotor radial direction. The unitary unit 111c has a sleeve 112c and an insertion member 114c. The sleeve 112c has a shape obtained by integrating the sleeve 112 and the liner 108. Specifically, a surface of the sleeve 112c on the inner circumferential side has a tapered shape with the diameter decreasing toward the inner side in the rotor radial direction and an end thereof on the inner side in the rotor radial direction protrudes farther toward an inner side in the radial direction of the sleeve 112c than a shape along the taper. Protrusion of the sleeve 112c at the end on the inner side in the rotor radial direction farther toward the inner side in the radial direction of the sleeve 112c than the shape along the taper enables reliable contact with the insertion member 114 of the unitary unit 111 on the inner side in the rotor radial direction. The insertion member 114c has a shape identical to that of the insertion member 114.

In the fixing device 100c, due to serial placement of the unitary units 111 and 111c, sealing surfaces can be formed in the respective unitary units 111 and 111c. Accordingly, the sealing property of the seal unit 104c can be enhanced. The fixing device 100c further includes the liner 108 between the unitary unit 111 and the unitary unit 111 and between the unitary unit 111 and the radial pin 102. Placement of the liner 108 enables the sleeve 112 and the radial pin 102 or the insertion member 114 to be in contact with each other more reliably and enables the position of the unitary units 111 in the rotor radial direction to be adjusted. While the unitary units 111 and the unitary unit 111c are combined in the fixing device 100c, all unitary units can be the unitary units 111 or the unitary units 111c.

Figure 17:
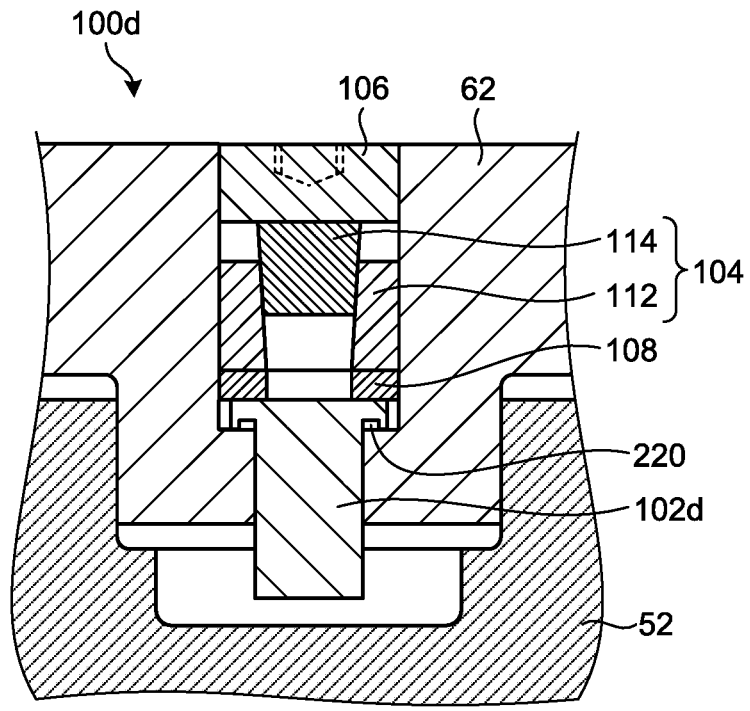
FIG. 17 is a schematic diagram illustrating a general configuration of another example of the fixing device.

FIG. 17 is a schematic diagram illustrating a general configuration of another example of the fixing device. A fixing device 100d illustrated in FIG. 17 has a radial pin 102d including a seal ring 220. The seal ring 220 is placed on a surface of the flange of the radial pin 102d on the inner side in the rotor radial direction, that is, a surface being in contact with the stepped portion 69 of the through hole 66. The seal ring 220 is an elastic member provided on the entire circumference of the radial pin 102d in the radial direction and adheres to the stepped portion 69. Due to provision of the seal ring 220 and biasing of the radial pin 102d to the inner side in the rotor radial direction with the seal unit 104, the fixing device 100d can also seal between the radial pin 102d and the through hole 66. This can improve the sealing property.

Figure 18:
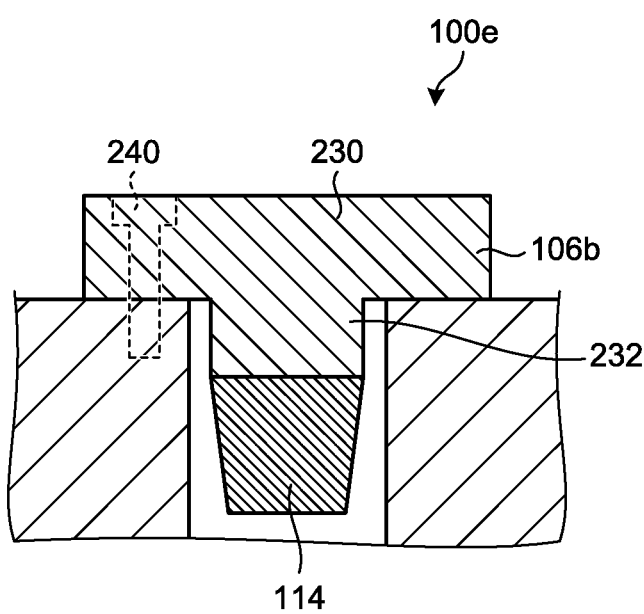
FIG. 18 is a schematic diagram illustrating a general configuration of another example of the fixing device.
Figure 19:
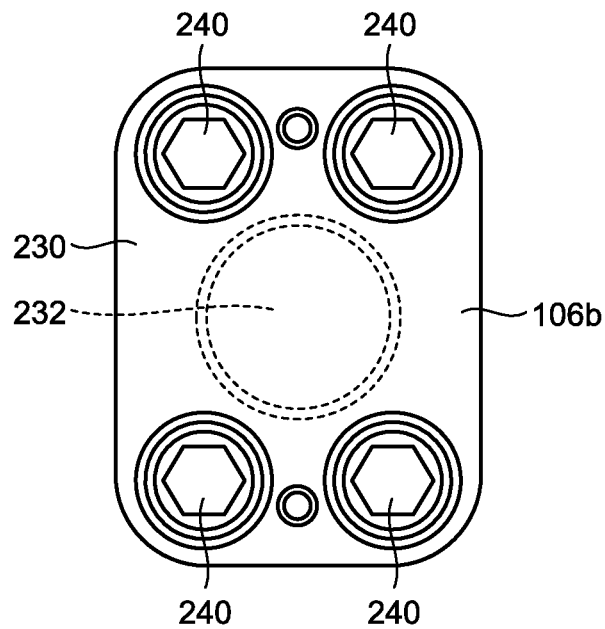
FIG. 19 is a top view illustrating a general configuration of a cap member.

FIG. 18 is a schematic diagram illustrating a general configuration of another example of the fixing device. FIG. 19 is a top view illustrating a general configuration of a cap member. A fixing device 100e illustrated in FIG. 18 has a cap member 106b fixed to the outer-member upper half 62 with bolts 240. The cap member 106b has a plate portion 230 blocking the through hole, and a protruding portion 232 protruding from the plate portion 230 into the through hole 66 to be in contact with the insertion member 114. The plate portion 230 is larger than the through hole 66 and blocks all over the through hole 66. A portion of the plate portion 230 in the cap member 106b larger than the through hole 66 is in contact with a surface of the outer-member upper half 62 on the outer side in the rotor radial direction. The bolts 240 are provided at positions of the plate portion 230 being in contact with the outer-member upper half 62 and are screwed into screw holes provided in the outer-member upper half 62. In the cap member 106b, the bolts 240 are provided at four positions so as to enclose the protruding portion 232 as illustrated in FIG. 19. In this way, the fixing device 100e is fixed to the outer-member upper half 62 with the bolts 240 without providing a screw hole in the through hole 66. The cap member 106b thus can be fixed to the outer-member upper half 62 using the bolts 240. By forming the cap member 106b to have a substantially rectangular shape having a short-side direction and a long-side direction when viewed from the outer side in the rotor radial direction, the fixing device 100e can be installed also in a case where a space for attaching the cap member is narrow.

The number of the bolts 240 in the case where the cap member is fastened with the bolts 240 is not particularly limited. For example, the bolts 240 can be provided at six positions in the cap member 106b so as to enclose the protruding portion 232. While an increase in the number of the bolts 240 in the cap member 106b enlarges the fixing device, the fixing device can be fixed to the outer-member upper half 62 more reliably.

Figure 20:
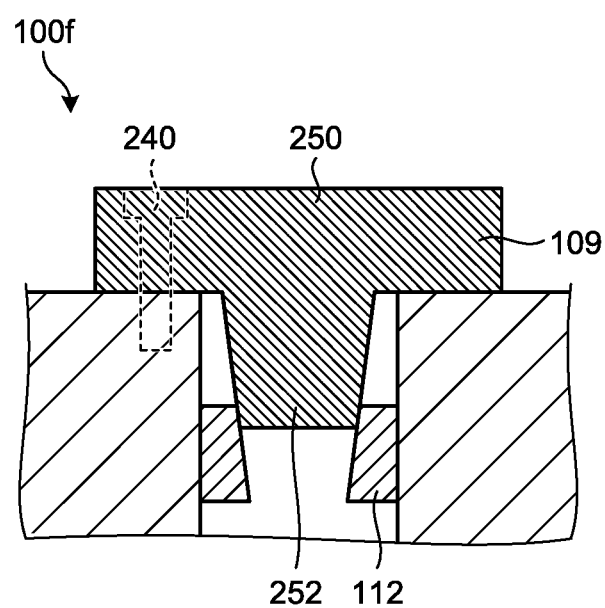
FIG. 20 is a schematic diagram illustrating a general configuration of another example of the fixing device.

FIG. 20 is a schematic diagram illustrating a general configuration of another example of the fixing device. A fixing device 100f illustrated in FIG. 20 has a sealing member 109. The sealing member 109 is a member obtained by integrating the cap member 106 and the insertion member 114 of the fixing device 100. The sealing member 109 has a plate portion 250 that blocks the through hole, and a protruding portion 252 that protrudes from the plate portion 250 to the through hole 66 to be in contact with the sleeve 112. The plate portion 250 is larger than the through hole 66 and blocks all over the through hole 66. In the cap member, a part of the plate portion 250 larger than the through hole 66 is in contact with a surface of the outer-member upper half 62 on the outer side in the rotor radial direction. The bolts 240 are provided at positions of the plate portion 250 being in contact with the outer-member upper half 62 and are screwed into screw holes provided in the outer-member upper half 62. The protruding portion 252 has a shape with a diameter of an outer circumferential surface decreasing toward the inner side in the rotor radial direction to form a taper. The outer circumferential surface of the protruding portion 252 is in contact with the inner circumferential surface of the sleeve 112. Due to contact of the protruding portion 252 with the sleeve 112 and contact of the sleeve 112 with the inner circumferential surface of the through hole 66, the through hole 66 is blocked. The cap member 106 and the insertion member 114 can be integrated in this way.

Figure 21:
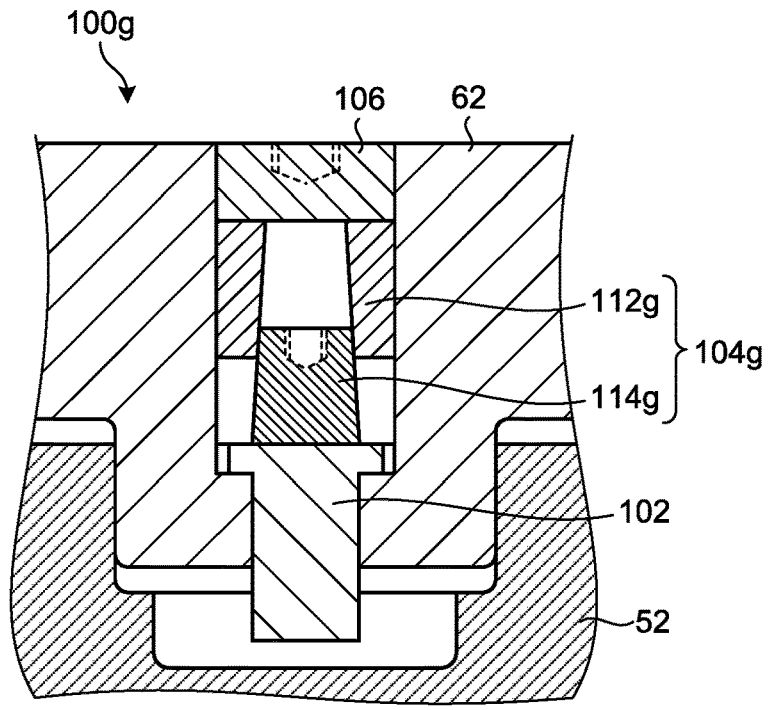
FIG. 21 is a schematic diagram illustrating a general configuration of another example of the fixing device.

FIG. 21 is a schematic diagram illustrating a general configuration of another example of the fixing device. A fixing device 100g illustrated in FIG. 21 has a seal unit 104g including a sleeve 112g and an insertion member 114g. In the seal unit 104g, the sleeve 112g is placed on a side nearer the cap member 106 than the insertion member 114g. That is, in the seal unit 104g, the insertion member 114g is placed on a side nearer the radial pin 102 than the sleeve 112g. An inner circumferential surface of the sleeve 112g and an outer circumferential surface of the insertion member 114g have a taper oriented so that the diameter is decreased toward the outer side in the rotor radial direction. In this way, in the fixing device 100g, the sleeve 112g and the insertion member 114g of the seal unit 104g are placed oppositely to those in the fixing device 100. As described above, even when the sleeve 112g is placed on the side nearer the cap member 106 than the insertion member 114g, movement of the radial pin 102 to the outer side in the rotor radial direction can be restrained while sealing with the seal unit 104g is achieved.

Figure 22:
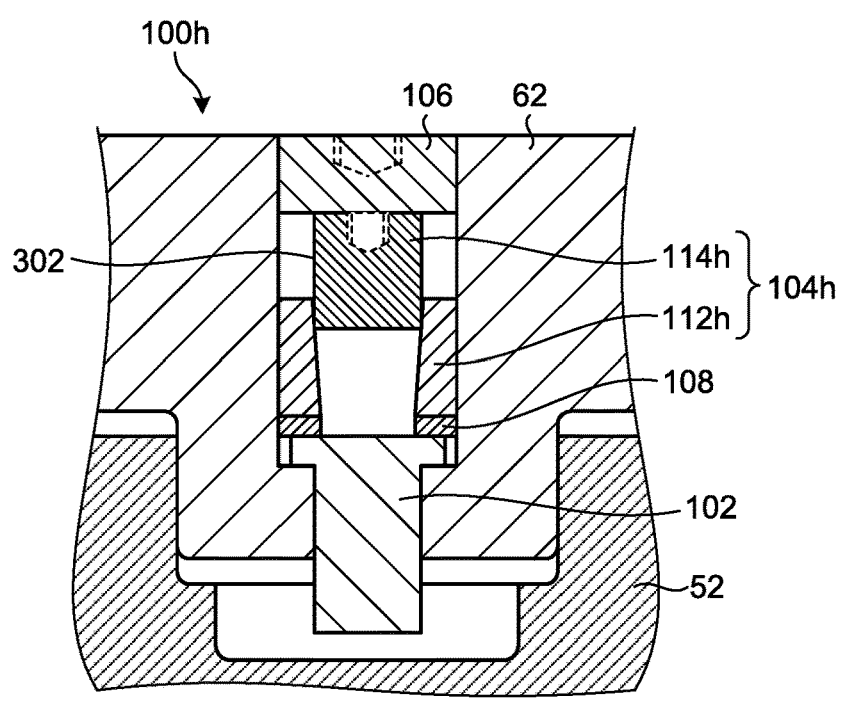
FIG. 22 is a schematic diagram illustrating a general configuration of another example of the fixing device.
Figure 23:
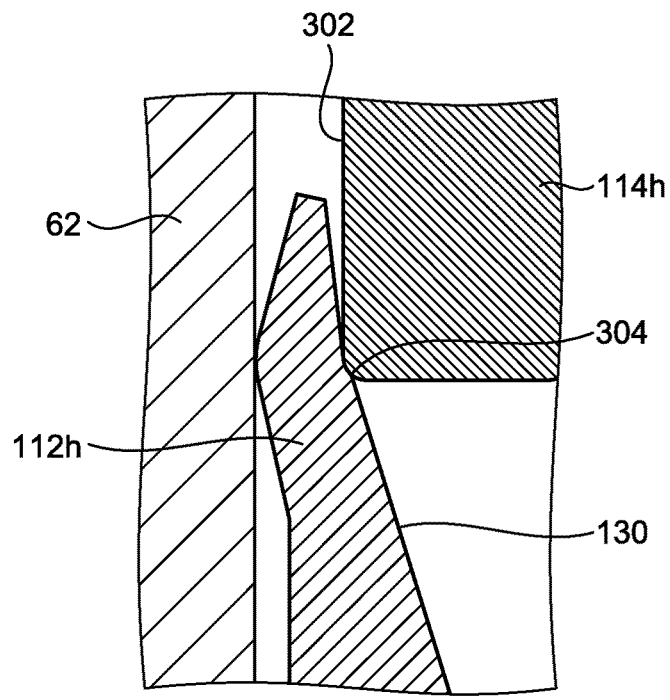
FIG. 23 is a schematic diagram enlargedly illustrating a contact portion between a sleeve and an insertion member of the fixing device illustrated in FIG. 22.

FIG. 22 is a schematic diagram illustrating a general configuration of another example of the fixing device. FIG. 23 is a schematic diagram enlargedly illustrating a contact portion between a sleeve and an insertion member of the fixing device illustrated in FIG. 22. A fixing device 100h illustrated in FIGS. 22 and 23 has the radial pin 102, a seal unit 104h, and the liner 108. The seal unit 104h has a sleeve 112h and an insertion member 114h. The sleeve 112h has a taper oriented so that the diameter of the inner circumferential surface 130 is decreased toward the inner side in the rotor radial direction similarly to the sleeve 112. The insertion member 114h has a shape with the diameter of an outer circumferential surface 302 fundamentally uniform in the rotor radial direction, that is, a cylindrical shape. In the insertion member 114h, an outer circumferential surface of an end located on the inner side in the rotor radial direction, that is, a corner portion 304 has a rounded shape. In the seal unit 104h, the corner portion 304 of the insertion member 114h and the inner circumferential surface 130 of the sleeve 112h are in contact with each other. Accordingly, as illustrated in FIG. 23, a part of the sleeve 112h being in contact with the corner portion 304 is deformed outward in the radial direction of the sleeve 112h and the outer circumferential surface of the sleeve 112h is brought into contact with the through hole 66 of the outer-member upper half 62.

As described above, also the insertion member 114h with the outer circumferential surface of the shape not being the tapered shape can deform the sleeve 112h to form a sealing surface. Furthermore, due to the rounded shape of the corner portion 304 of the insertion member 114h, the corner portion 304 can be restrained from being caught on the inner circumferential surface 130 of the sleeve 112h and the sleeve 112h is enabled to be easily deformed.

Figure 24:
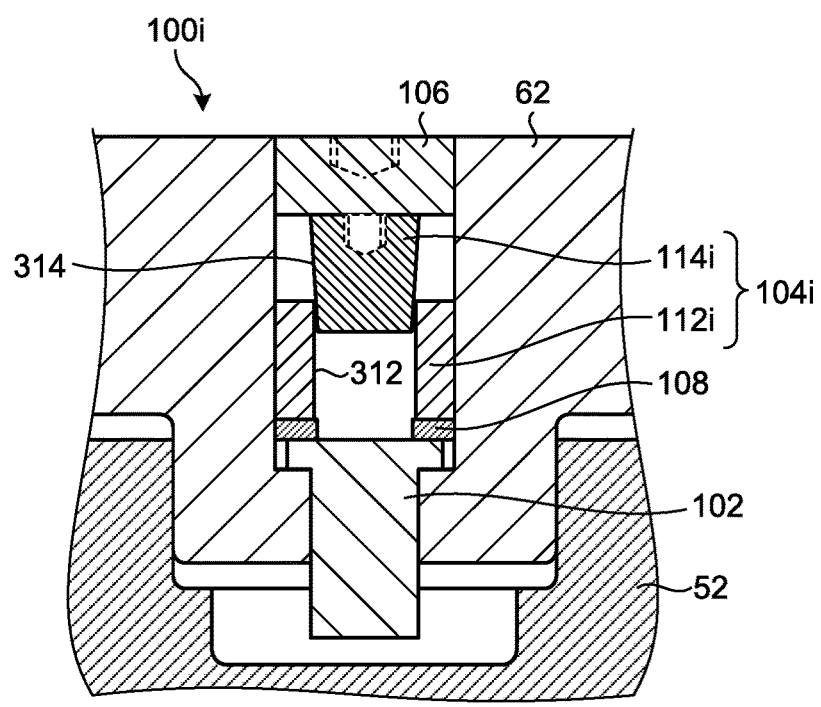
FIG. 24 is a schematic diagram illustrating a general configuration of another example of the fixing device.

FIG. 24 is a schematic diagram illustrating a general configuration of another example of the fixing device. A fixing device 100i illustrated in FIG. 24 has a seal unit 104i including a sleeve 112i, an insertion member 114i, and the liner 108. The sleeve 112i has a shape with the diameter of an inner circumferential surface 312 being fundamentally uniform in the rotor radial direction. A taper oriented so that the diameter of an outer circumferential surface 314 is decreased toward the inner side in the rotor radial direction is formed on the insertion member 114i. In the seal unit 104i, an end of the sleeve 112i on the outer side in the rotor radial direction is in contact with the outer circumferential surface 314 of the insertion member 114i.

As described above, also with the shape in which the inner circumferential surface of the sleeve 112i is not formed in a tapered shape, a sealing surface can be formed at a contact position between the sleeve 112i and the insertion member 114i.

While the fixing device 100 is provided at a position highest in the rotor rotational direction, that is, an end on an upper side in the vertical direction in the embodiment described above, the fixing device is not limited thereto. The fixing device 100 can be provided at any position in the rotational direction of the rotor 16. For example, the fixing device can be installed at a lowest position in an outer member, that is, in a through hole at an end on a lower side in the vertical direction. That is, the fixing device described above can be provided on an outer-member lower half. Also when a fixing device is provided on the outer-member lower half, the attaching method and the detaching method of a fixing device described above can be used and can be applied to a manufacturing method of a rotary machine, an assembling method thereof, and a disassembling method (a releasing method) thereof.

REFERENCE SIGNS LIST 10 steam turbine
16 rotor
30 blade
34 inner casing
36 outer casing
40 steam inlet
42 vane
50 annular member
51 inner member
52 inner-member upper half
54 inner-member lower half
56 concave portion
57 groove portion
60 outer member
62 outer-member upper half
64 outer-member lower half
65 convex portion
66 through hole
67 first surface
68 second surface
68a thread groove
69 stepped portion
70 fixing unit
72 outer-member fixing device
100 fixing device
102 radial pin
104 seal unit
106, 106a cap member
108 liner
111 unitary unit
112 sleeve
114 insertion member
121 outer circumferential surface
122 flange
124 screw hole
126 cutout surface
130 inner circumferential surface
140 outer circumferential surface
150 cylindrical hole
142 thread groove
162 outer circumferential surface
164 thread groove

The invention claimed is:

1. A fixing device that fixes a relative position in a rotational direction of an outer member and an inner member of a stationary body of a rotary machine, the fixing device comprising:
a radial pin that is inserted into a through hole passing through the outer member in a radial direction of the rotary machine and having a stepped portion formed therein to have a larger diameter at a portion on an outer side in the radial direction of the rotary machine than at a portion on an inner side in the radial direction, that includes a part on the inner side in the radial direction of the rotary machine to be inserted into a concave portion of the inner member, and that includes a flange portion on the outer side in the radial direction of the rotary machine, an outside diameter of the flange portion being larger than a diameter of the through hole at the portion on the inner side in the radial direction of the rotary machine;
a seal unit that is inserted into the through hole, that is located farther on the outer side in the radial direction of the rotary machine than the radial pin, and that is in contact with an inner circumferential surface of the through hole along the radial direction of the rotary machine to seal the through hole; and
a cap member that is placed on the outer side of the seal unit in the radial direction of the rotary machine, and that is fixed to the outer member,
wherein the flange portion has an outside diameter smaller than a diameter of the through hole at the portion on the outer side in the radial direction of the rotary machine, and contacts with the stepped portion.

2. The fixing device according to claim 1, wherein the seal unit includes
a sleeve that has a diameter of an inner circumferential surface changing along the radial direction of the rotary machine, and
a columnar insertion member that is inserted into the sleeve and is in contact with the inner circumferential surface of the sleeve, wherein
an outer circumferential surface of the sleeve is in contact with the through hole, and the inner circumferential surface of the sleeve and the insertion member are in contact with each other to seal the through hole.

3. The fixing device according to claim 2, wherein the sleeve includes the inner circumferential surface passing through the sleeve along the radial direction of the rotary machine, and
the radial pin includes an engagement portion to and from which a jig is attachable and detachable from the outer side in the radial direction being formed on an end face thereof on the outer side in the radial direction.

4. The fixing device according to claim 2, wherein the sleeve is placed farther on the inner side in the radial direction of the rotary machine than the insertion member.

5. The fixing device according to claim 2, comprising a liner placed between the sleeve and the radial pin, wherein
the liner has an outside diameter larger than an outside diameter of the radial pin and extends in a radial direction of the radial pin farther to an inner side than the outside diameter of the radial pin.

6. The fixing device according to claim 2, comprising a plurality of the seal units, wherein
the seal units are placed serially in the radial direction of the rotary machine.

7. The fixing device according to claim 1, wherein the cap member includes a thread groove formed in an outer circumferential surface, and is screwed into a thread groove formed in the through hole to be fixed to the outer member.

8. The fixing device according to claim 1, wherein the flange portion includes a seal ring placed on an end face thereof on the inner side in the radial direction of the rotary machine, and the seal ring is in contact with the through hole and the flange portion.

9. A rotary machine comprising:
the fixing device according to claim 1;
the outer member;
the inner member; and
a rotary body placed farther on the inner side in the radial direction of the rotary machine than the inner member.

10. The rotary machine according to claim 9, wherein the outer member includes a convex portion that protrudes inward in the radial direction of the rotary machine at a part having the through hole formed therein, a surface along a direction perpendicular to an axis of the rotary machine is formed in a rotational direction on the convex portion, the inner member includes a groove portion at a part facing the convex portion, the groove portion being concave inward in the radial direction of the rotary machine and being in contact with the surface of the convex portion along the direction perpendicular to the axis of the rotary machine, and a surface of the groove portion in contact with the surface of the convex portion along the direction perpendicular to the axis of the rotary machine is a surface along the direction perpendicular to the axis of the rotary machine.

11. A manufacturing method of a rotary machine for fixing a relative position in a rotational direction of an outer member and an inner member of a stationary body of a rotary machine and manufacturing the rotary machine, the manufacturing method comprising the steps of:

inserting, into a through hole passing through the outer member in a radial direction of the rotary machine and having a stepped portion formed therein to have a larger diameter at a portion on an outer side in the radial direction of the rotary machine than at a portion on an inner side in the radial direction, a radial pin that includes a flange portion with an outside diameter larger than a diameter of the through hole at the portion on the inner side in the radial direction of the rotary machine and smaller than a diameter of the through hole at the portion on the outer side in the radial direction of the rotary machine, bringing the stepped portion and the flange portion into contact, and inserting an end of the radial pin on the inner side in the radial direction of the rotary machine into a concave portion of the inner member placed on the inner side of the outer member in the radial direction of the rotary machine;

inserting a seal unit into the through hole having the radial pin inserted therein; and biasing the seal unit inserted into the through hole inward in the radial direction of the rotary machine, and bringing the seal unit into contact with an inner circumferential surface of the through hole along the radial direction of the rotary machine to seal the through hole.

12. The manufacturing method of a rotary machine according to claim 11, comprising a step of increasing a diameter of a hole, formed in the outer member along the radial direction of the rotary machine, at a portion of the hole on the outer side in the radial direction of the rotary machine relative to a diameter of the hole to form the through hole.

13. A disassembling method of a rotary machine for disassembling a rotary machine having an inner member and an outer member of a stationary body fixed with a fixing device, the fixing device including, in a through hole formed in the outer member, a radial pin that includes a part on an inner side in a radial direction of the rotary machine inserted into a concave portion of the inner member, a seal unit that is located farther on an outer side in the radial direction of the rotary machine than the radial pin, and that is in contact with an inner circumferential surface of the through hole along the radial direction of the rotary machine to seal the through hole, and a cap member fixed to the outer member farther on the outer side in the radial direction of the rotary machine than the seal unit, the disassembling method comprising the steps of:

disassembling the cap member inserted into the through hole;

taking the seal unit out of the through hole; and taking the radial pin out of the through hole, wherein the seal unit includes a sleeve being in contact with the through hole, the step of taking the seal unit out of the through hole includes the steps of attaching a jig to an engagement portion of a target member that is in direct or indirect contact with a surface of the sleeve on the inner side in the radial direction of the rotary machine and that includes the engagement portion to which the jig is attachable from the outer side in the radial direction of the rotary machine formed on a surface on the outer side in the radial direction of the rotary machine, and taking the sleeve out of the through hole along with the target member, and the jig is inserted into the sleeve and the jig is attached to the engagement portion at the step of taking the seal unit out of the through hole.

14. A disassembling method of a rotary machine for disassembling a rotary machine having an inner member and an outer member of a stationary body fixed with a fixing device, the fixing device including, in a through hole formed in the outer member, a radial pin that includes a part on an inner side in a radial direction of the rotary machine inserted into a concave portion of the inner member, a seal unit that is located farther on an outer side in the radial direction of the rotary machine than the radial pin, and that is in contact with an inner circumferential surface of the through hole along the radial direction of the rotary machine to seal the through hole, and a cap member fixed to the outer member farther on the outer side in the radial direction of the rotary machine than the seal unit, the disassembling method comprising the steps of:

disassembling the cap member inserted into the through hole;

taking the seal unit out of the through hole; and taking the radial pin out of the through hole, wherein the outer member includes a structure divided into an outer-member upper half and an outer-member lower half, the disassembling method includes the steps of passing a tool through the through hole of the outer-member upper half or the outer-member lower half from which the radial pin has been taken out, and holding the inner member with the tool, and relatively moving the outer-member upper half or the outer-member lower half from which the radial pin has been taken out with respect to the inner member in a state where the inner member is held with the tool.

* * * * *